(12) United States Patent
Otsuki et al.

(10) Patent No.: US 6,301,215 B1
(45) Date of Patent: Oct. 9, 2001

(54) RECORDING MEDIUM DRIVING APPARATUS

(75) Inventors: Akira Otsuki; Akira Kurita, both of Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/347,095

(22) Filed: Jul. 2, 1999

(30) Foreign Application Priority Data

Jul. 3, 1998 (JP) .................................................. 10-188722
Jul. 23, 1998 (JP) .................................................. 10-207527

(51) Int. Cl.$^7$ .................................................. G11B 17/04
(52) U.S. Cl. .................... 369/77.2; 369/75.2; 360/99.02; 360/99.06
(58) Field of Search ................................. 369/75.1, 75.2, 369/77.1, 77.2; 360/96.5, 99.02, 99.06

(56) References Cited

U.S. PATENT DOCUMENTS

| | | | |
|---|---|---|---|
| 5,696,746 | * 12/1997 | Ookawa et al. | 369/77.2 |
| 5,898,658 | * 4/1999 | Niioka et al. | 369/75.2 |
| 6,078,553 | * 6/2000 | Niioka et al. | 369/77.2 |
| 6,081,494 | * 6/2000 | Morimoto et al. | 369/77.2 |

* cited by examiner

Primary Examiner—William Klimowicz

(74) Attorney, Agent, or Firm—Brinks Hofer Gilson & Lione

(57) ABSTRACT

The present invention provides a recording medium driving apparatus comprising an enclosure having an insertion port for insertion and discharge of a recording medium; a holder holding the recording medium inserted through the insertion port; a driving section having a turntable onto which the recording medium held by the holder is mounted and a locating member for positioning the recording medium; a holder transfer mechanism for transferring the holder in a first direction approaching the driving section and in a second direction leaving the driving section; an elastic support member elastically supporting the driving section in the enclosure; and a constraining mechanism constraining transfer of the driving section; and before the holder having the recording medium inserted therein is transferred by the holder transfer mechanism in the first direction, or after beginning moving in the first direction and before a recording medium inserted in an abnormal direction or posture comes into contact with the turntable or the locating member, the constrained state of the driving section by the constraining mechanism is released. As a result, it is possible to alleviate the pressing force, produced when the holder holding a recording medium inserted in an abnormal state approaches the driving section and the recording medium in the holder comes into contact with the turntable or the locating member, under the effect of elastic supporting members supporting the driving section, thus preventing deformation or a positional shift of the turntable or deformation of, or damage to, the recording medium.

21 Claims, 9 Drawing Sheets

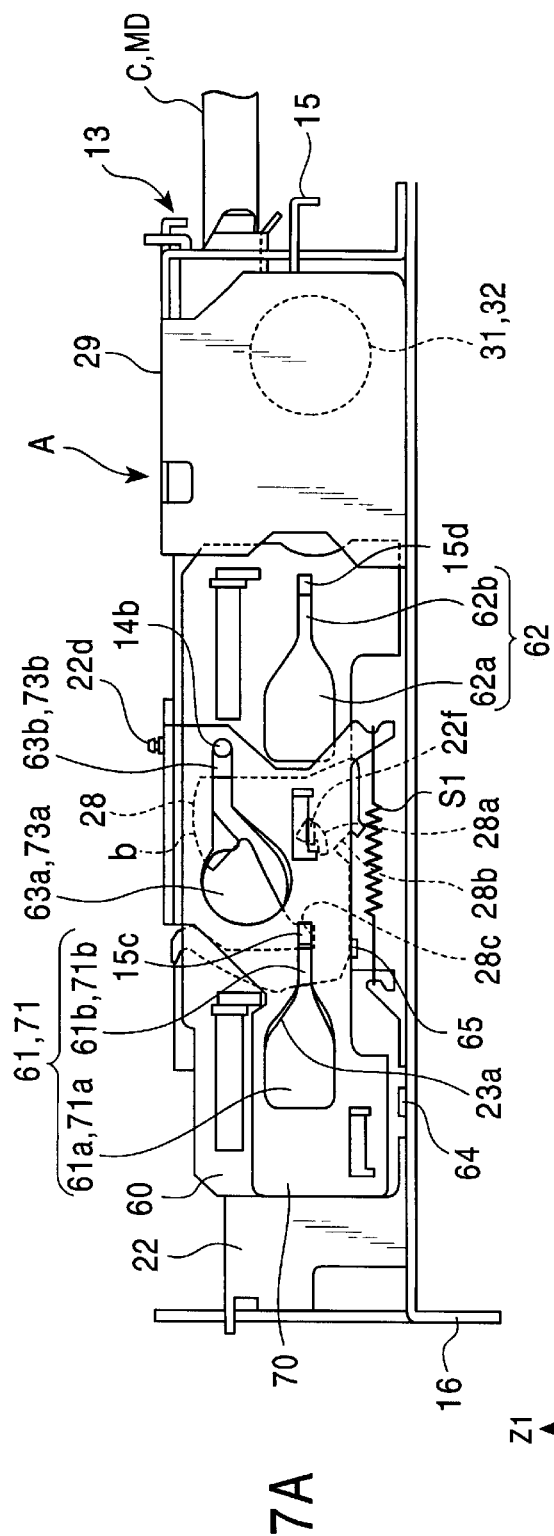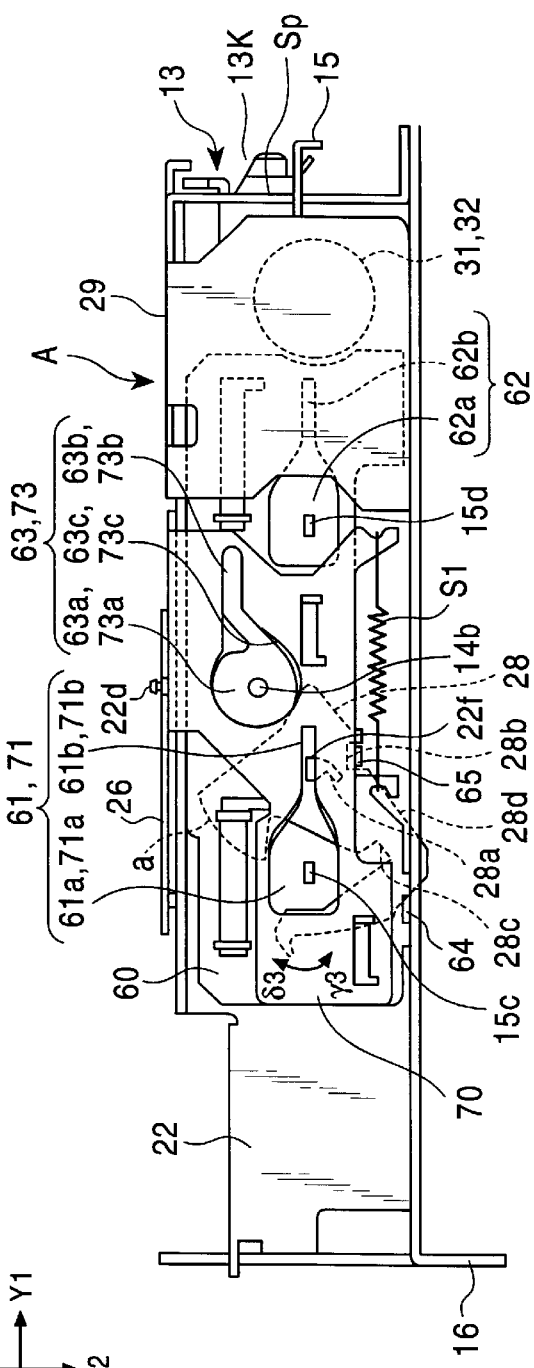

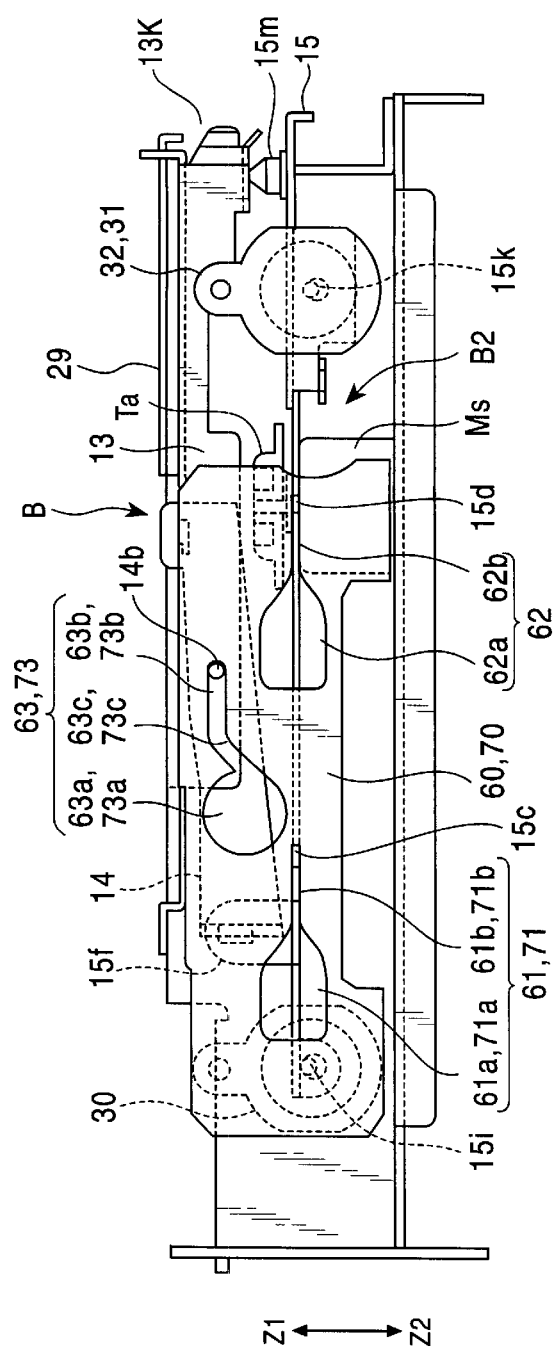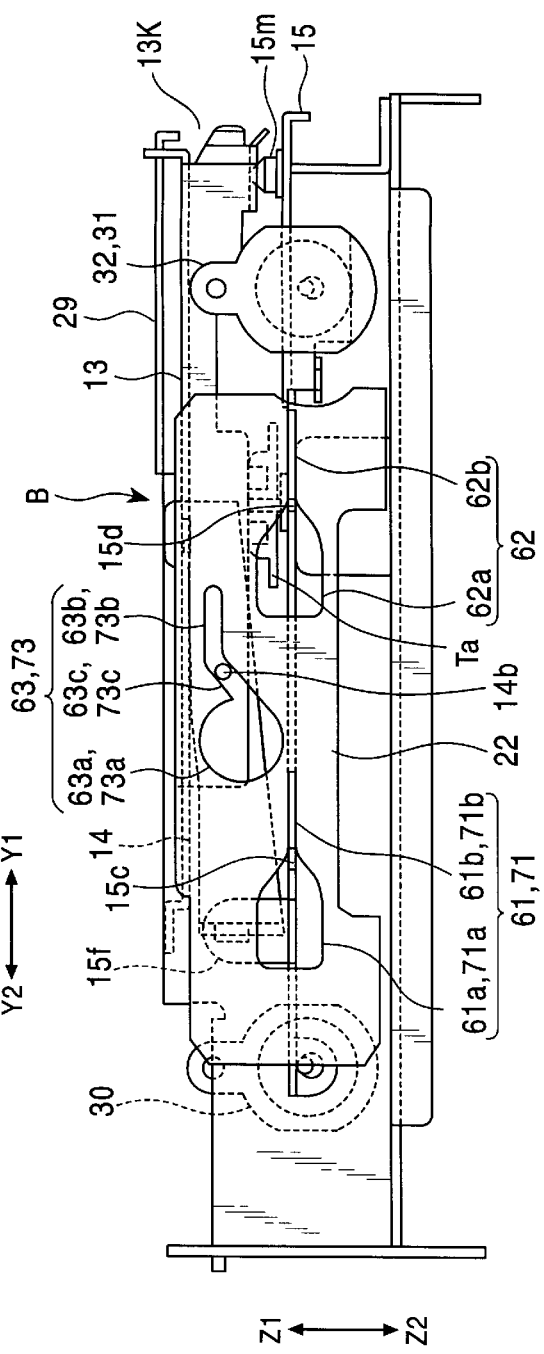
FIG. 8A
FIG. 8B

FIG. 9
PRIOR ART
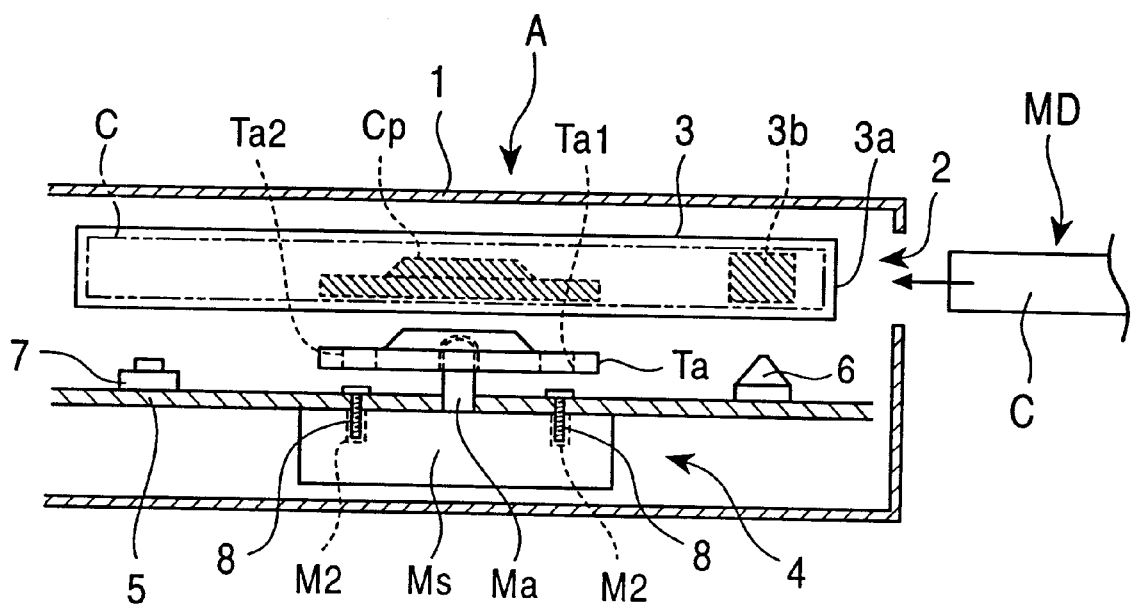
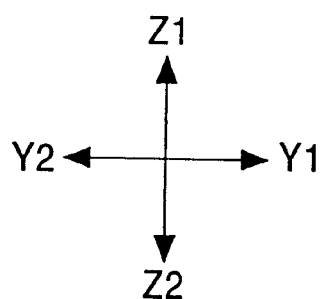

RECORDING MEDIUM DRIVING APPARATUS

BACKGROUND OF THE INVENTION

1. Field of the Invention

The present invention relates to a recording medium driving apparatus driving a recording medium such as a MD (mini-disk). More particularly, the present invention relates to a recording medium driving apparatus in which deformation of a turntable or a recording medium itself upon insertion of the recording medium in an abnormal state is prevented.

2. Description of the Related Art

FIG. 9 is a principle diagram illustrating the internal structure of a conventional recording medium driving apparatus.

The recording medium driving apparatus A shown in FIG. 9 is, for example, a MD (mini-disk) player which records and/or reproduces information on a recording medium such as a photomagnetic disk housed in an external case such as a cartridge C.

Reference numeral 1 represents an enclosure of the MD player (recording medium driving apparatus), and this enclosure 1 has an insertion port 2 provided on the right end side thereof. A holder 3 is provided in the enclosure 1, and an opening 3a of the holder 3 faces the foregoing insertion port 2. In the standby state shown in FIG. 9, the holder 3 is at an elevated position in the Z1 direction in the drawing.

A driving section 4 is provided below (Z2 direction) the holder 3 and is elastically supported by an elastic supporting member such as a damper (not shown). As a result, even when mounted in an automobile, vibration from the automobile body does not directly act on the driving section 4. The driving section 4 is provided on a driving base 5, and there is provided a spindle motor Ms that imparts a rotational force to a photomagnetic disk in the cartridge C. A recording/reproducing head (not shown) conducting recording on and/or reproduction from the MD is provided so as to permit scanning in the radial direction of the photomagnetic disk. A turntable Ta is firmly secured to the leading end of a rotation shaft Ma of the spindle motor Ms by a fixing means such as pressure-insertion.

A locator pin 6 projecting in the Z1 direction in the drawing is provided at an end of the driving base 5. When the MD is inserted in the normal direction and posture into the holder 3, a positioning hole 3b formed in the cartridge C faces the locator pin 6. A detection switch 7 is provided on the driving base 5 so as to permit detection of end of loading of the MD in the driving section 4.

The recording medium such as a MD is inserted into the recording medium driving apparatus through the insertion port 2 and held in the holder 3 via the opening 3a. The holder 3 is brought down in the Z2 direction by a lifting member (not shown). When the MD is inserted in the normal direction and posture into the holder 3, a clamping plate Cp of the photomagnetic disk exposed to the bottom surface of the MD is attached to the turntable Ta in the aforementioned descending operation. At this point, the locator pin 6 enters into the positioning hole 3b formed in the bottom surface end of the cartridge C of the MD. The bottom surface of the holder 3 of the cartridge C presses an actuator of the detection switch 7, thus permitting detection of the loading of the MD in a normal condition.

Upon discharge of the MD, the holder 3 is lifted by the lifting member in the Z1 direction in the drawing, and the clamping plate Cp leaves the turntable Ta. At this point, the locator pin 6 escapes from the positioning hole 3b, and the pressure on the detection switch 7 is released. When the holder 3 reaches the elevated standby position, the MD in the holder 3 is discharged by discharge means not shown from the insertion port 2 to outside the enclosure 1.

The above-mentioned recording medium driving apparatus has, however, the following problems.

The recording medium such as a MD may sometimes be inserted into the holder in an abnormal direction or posture including an upside-down (reversed) state or with wrong longitudinal and transverse sides. In such a case, in the MD player, it is impossible to detect the insertion of the MD in an abnormal direction or posture upon insertion of the MD into the holder 3, and the holder 3 descends in the Z2 direction just as in a normal insertion. However, when the MD is inserted into the holder 3 in an abnormal state, the turntable Ta does not positionally agree with the clamping plate Cp of the photomagnetic disk in the cartridge C.

Therefore, when the holder 3 descends in this abnormal insertion state, the turntable Ta and the clamping plate Cp do not face each other. For example, the outer surface of the cartridge C comes into contact with the turntable Ta, thus pressing down (in the Z2 direction) the turntable Ta. If, in this state, the detection switch 7 cannot detect the completion of loading of the MD within a prescribed period of time, the MD is judged to have been inserted erroneously (in an abnormal direction or posture), and as a result, the holder 3 goes up and the MD is discharged. However, a strong pressing force acts onto the turntable Ta during descent of the holder 3 as described above, resulting in problems of deformation of the turntable Ta itself, or if the turntable Ta and the rotation shaft Ma are not firmly secured, a positional shift of the turntable Ta in the axial direction of the rotation shaft Ma.

In order to prevent occurrence of these problems, it is necessary to form the turntable Ta from a metal to prevent deformation of the turntable Ta itself, and firmly secure the turntable Ta and the rotation shaft Ma by fabricating the inside diameter of a center hole of the turntable Ta with high accuracy and pressure-driving this center hole onto the rotation shaft Ma, thereby preventing a positional shift of the turntable Ta.

However, a structure in which the turntable Ta made of a metal and the rotation shaft Ma of spindle motor Ms are pressure-driven requires high-accuracy operations such as cutting, piercing and pressure-fabrication of the turntable Ta, leading to a higher cost. When, after pressure-driving the turntable Ta onto the rotation shaft Ma, the spindle motor Ms is fixed in a state in which the rotation shaft Ma is inserted sideways into a notch in the driving base 5, it is necessary to pierce, in the turntable Ta, holes Ta1 and Ta2 for inserting a screw tightening tool (driver) for tightening screws 8 into fixing holes M2 formed in the spindle motor Ms. Cutting these holes Ta1 and Ta2 in the turntable Ta results in a further higher fabrication cost.

When the holder 3 having the MD in an abnormal state descends, the positioning hole 3b formed in the cartridge C does not face the locator pin 6. As a result, the lower surface of the cartridge C hits the locator pin 6 along with descent of the holder 3, so that the cartridge C is strongly pressed against the locator pin 6. The cartridge C may therefore deform or suffer damage.

SUMMARY OF THE INVENTION

The present invention was developed to solve these problems and has an object to provide a recording medium driving apparatus which, when receiving a recording medium inserted in an abnormal direction or posture, prevents the occurrence of deformation or positional shift of the turntable, or deformation of the recording medium itself.

The present invention provides a recording medium driving apparatus comprising an enclosure having an insertion port for insertion and discharge of a recording medium; a holder for holding the recording medium that is inserted through the insertion port; a driving section having a turntable onto which the recording medium held by the holder is mounted and a locating member for positioning the recording medium; a holder transfer mechanism for transferring the holder in a first direction approaching the driving section and in a second direction leaving the driving section; an elastic support member elastically supporting the driving section in the enclosure; and a constraining mechanism constraining transfer of the driving section at least in the first direction; wherein the recording medium driving apparatus has a configuration in which, when the holder having the recording medium inserted therein in an abnormal direction or posture moves in the first direction, the recording medium in the holder comes into contact with the turntable or the locating member; and before the holder having the recording medium inserted therein is transferred by the holder transfer mechanism in the first direction, or after beginning moving in the first direction and before the recording medium inserted in an abnormal direction or posture comes into contact with the turntable or the locating member, the constrained state of the driving section by the constraining mechanism in the first direction is released.

In the recording medium driving apparatus of the present invention, media such as photomagnetic disks or magnetic disks are housed in a cartridge or a hard case, including MDs (mini-disks) and FDs (floppy disks) as recording media, or memory cards or cassette tapes, and the apparatus is provided with the function of recording information onto the recording medium or the function of reproducing information recorded on the recording medium, or both recording and reproducing functions.

In the present invention, the driving section is supported by an elastic support member in the enclosure, and even when using the apparatus in an automobile or for portable uses, vibration or impact never acts directly on the driving section. The elastic support member may comprise a damper member such as an oil damper or a spring member such as a coil spring, or a combination of damper and spring members.

When the recording medium is inserted into the holder, the driving section is constrained by the constraining mechanism within the enclosure. Before the holder begins moving in the first direction approaching the driving section, or after the holder has begun moving in the first direction and before the recording medium in this holder comes into contact with the turntable or the locating member of the driving section, the constrained state of the driving section in the first direction by the constrained mechanism is released.

Therefore, even when the holder moves toward the driving section while holding therein the recording medium inserted in an abnormal direction or posture and the recording medium comes into contact with the turntable or the locating member, the constrained state of the driving section has already been released at this point, and the driving section is elastically held in the enclosure by the elastic support member. A strong pressing force therefore never acts on the turntable or the recording medium itself, and the problem of deformation or positional shift of the turntable or deformation of, or a damage to, the external case of the recording medium never occurs.

In the aforementioned recording medium driving apparatus of the invention, the configuration should preferably be such that the holder transfer mechanism comprises a moving member that is able to reciprocate in the enclosure and a coupling section connecting the moving member and the holder; the constraining mechanism comprises a constraining section provided on the moving member and an engagement section provided on the driving section and engaging with the constraining section of the moving member; the holder is caused by the coupling section to move in the second direction along with movement of the moving member in another direction, and simultaneously, movement of the driving section in the first direction is regulated by the constraining section; and the holder is caused by the coupling section to move in the first direction along with movement of the moving member in another direction, and simultaneously, the constrained state in the first direction of the driving section by the constraining section is released.

By interlocking movement of the holder in the first and second directions and constraining/releasing of the driving section with reciprocation of the single moving member, as described above, it is possible to use a common power source for the holder transfer mechanism and the constraining mechanism, reduce the number of parts, and thus reduce the manufacturing cost. It is also possible to set a delicate timing of movement of the holder in the first direction and the constraining releasing operation of the driving section from the shapes of the portion for driving the coupling section and the constraining section on one moving member or from relative positions of arrangement of these parts. This setting of timing can be carried out easily and at a high accuracy as compared with setting the operating timing of the individual mechanisms in combinations of many members, without the risk of a shift of the set timing.

The aforementioned holder transfer mechanism and constraining mechanism may be formed by providing the moving member so as to be able to reciprocate in a direction substantially perpendicular to the first and second directions within the enclosure, providing this moving member with an inclined cam which extends in inclination in the first and second directions and transfers the holder in the first and second directions via the coupling section, and a constraining groove which extends in the same direction as the moving direction of the moving member for insertion and release of the engagement section of the driving section.

BRIEF DESCRIPTION THE DRAWINGS

FIG. 2 shows front views of the disk driving apparatus shown in FIG. 1.

FIG. 6 illustrates the state in which a MD is being inserted into the holder.

FIG. 7 shows side views of the disk driving apparatus as viewed from the X2 direction: FIG. 7A illustrates a locked state, and FIG. 7B illustrates a non-locked state of the driving unit;

FIG. 8 shows side views for explaining the holder transfer mechanism and the constraining mechanism of the disk driving apparatus: FIGS. 8A illustrates a locked state of the driving unit, and FIG. 8B illustrates a lock release starting state in which the holder goes down slightly; and FIG. 9 is a simplified diagram illustrating the internal structure of a conventional recording medium driving apparatus.

DESCRIPTION OF THE PREFERRED EMBODIMENTS

The present invention will now be described with reference to the drawings.

Figure 1:
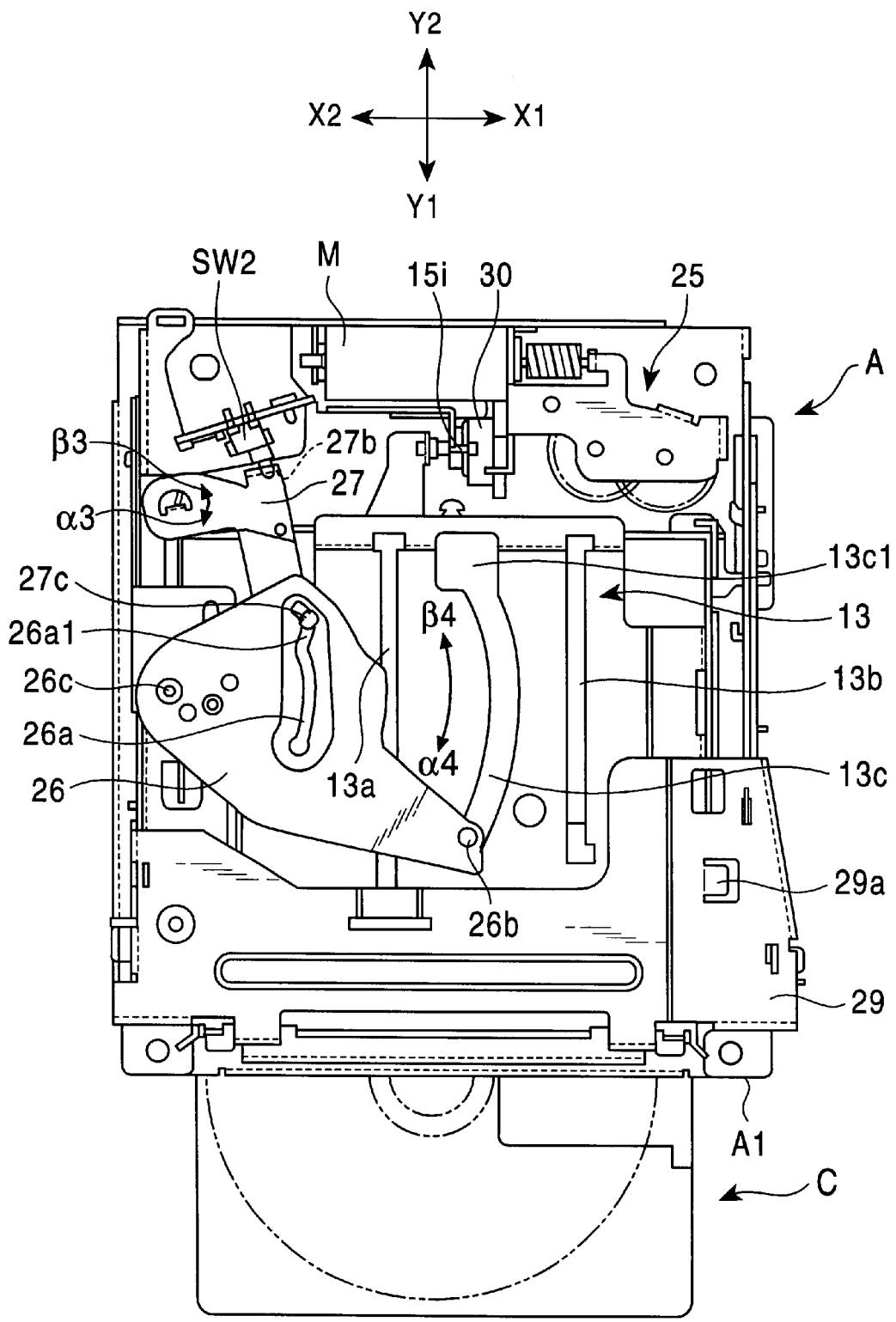
FIG. 1 is a plan view illustrating an embodiment of the present invention, representing a disk driving apparatus arranged in a MD player.
Figure 2A:
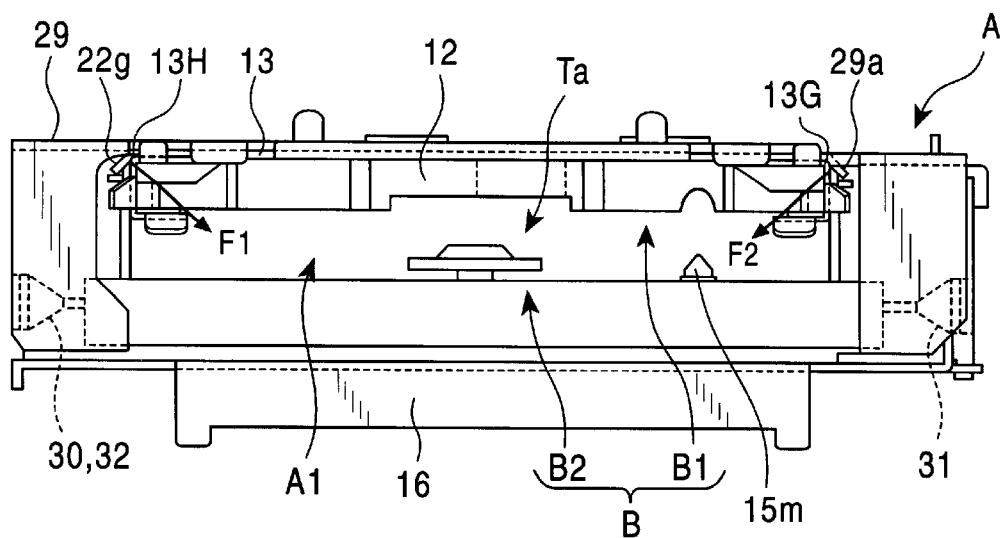
FIG. 2A illustrates the state in which the holder is spaced apart from the disk driving section.
Figure 2B:
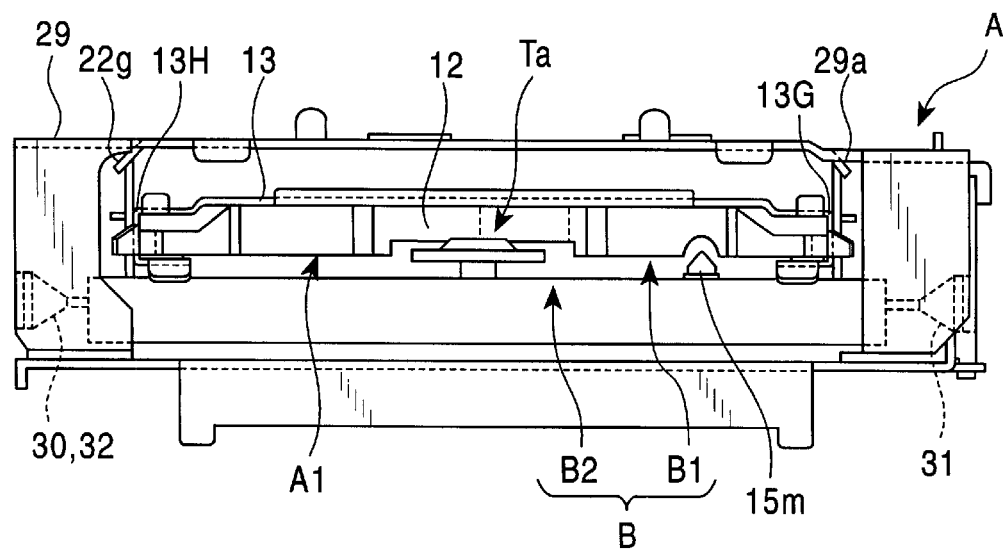
FIG. 2B illustrates the state in which the holder approaches the disk driving section.

The disk driving apparatus A shown in FIG. 1 is provided in a MD (mini-disk) player for mounting in an automobile, and reproduces signals recorded in the MD and/or records signals on the MD. As shown in FIGS. 2A and 2B, a surface on the Y1 side in the drawing of the disk driving apparatus A serves as an insertion surface A1 for insertion of the MD, a recording medium, into the disk driving apparatus A. In the depth (Y2) direction behind this insertion surface A1, there is provided a driving unit (disk holding-driving section) B comprising a disk holding section B1 and a disk driving section (driving section) relatively facing up and down (in the Z direction) the disk holding section B1. The disk driving apparatus A is arranged in the MD player enclosure 1 shown in FIG. 9. The foregoing disk holding section B1 is provided so as to face the insertion port 2 (see FIG. 9) formed on a front panel forming the enclosure 1.

Figure 3:
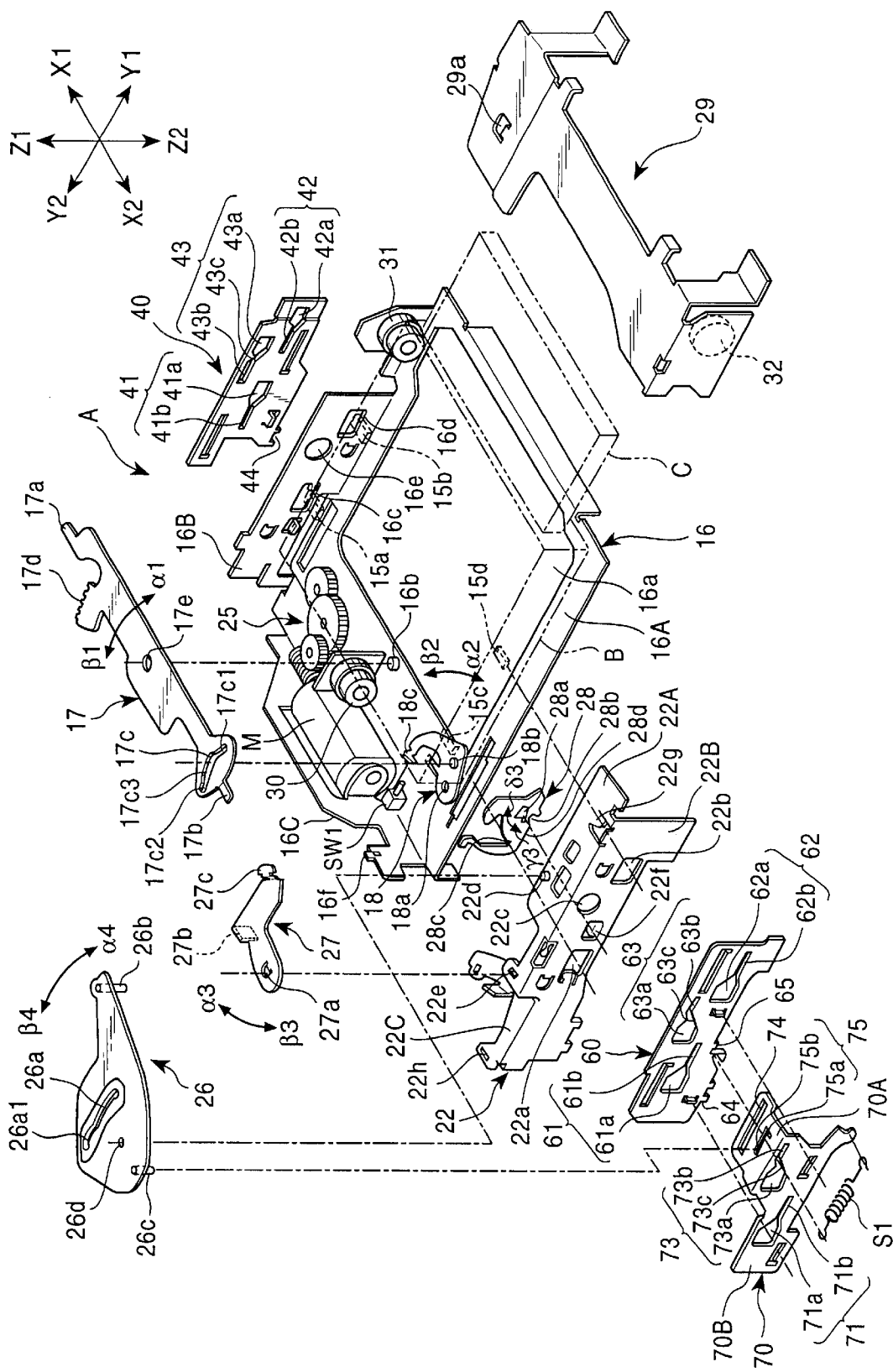
FIG. 3 is an exploded perspective view of the disk driving apparatus shown in FIG. 1.

In the disk driving apparatus A, as shown in FIG. 3, a driving unit B represented by a one-point broken line in the drawing is provided on a main chassis 16 formed by press-working a metal sheet. Reference numerals 16A, 16B and 16C represent a bottom plate, a side plate and a rear plate, respectively, of the main chassis 16.

A square shaped large rectangular hole 16a is pierced in the bottom plate 16A, and rotation shaft 16b is formed into a projecting form near the edge on the Y2 side of the large rectangular hole 16a. The rotation shaft 16b is inserted into a rotation hole 17e pierced at the center of a driving lever 17, whereby the driving lever 17 is supported rotatably in α1 and β1 directions shown in FIG. 3. A driving piece 17a is formed on the X1 side of the driving lever 17 in the drawing and inserted into a transmitting section 44 of a sliding plate 40 (moving member) described later. A fan-shaped gear section 17d is formed on the X2 side of the driving piece 17a.

On the X2 side of the driving lever 17 in the drawing, on the other hand, a driving groove 17c and a driving piece 17b are formed, and the driving piece 17b is engaged with a transmitting section 64 of a first sliding plate 60 (moving member) described later.

Near a cover of the large rectangular hole 16a of the main chassis 16, a first pressing member 18 is provided rotatably around a rotation shaft 18a by supporting the rotation shaft 18a on the bottom surface 16A. A convex portion represented by reference numeral 18b and a pressing piece represented by reference numeral 18c are formed on the first pressing member 18. The convex portion 18b is inserted into the driving groove 17c of the aforementioned driving lever 17. The first pressing member 18 is rotated in the α2 and β2 directions in the drawing by causing the driving lever 17 to rotate in the α1 and β1 directions.

A first switch SW1 is provided, on the other hand, at a position opposite to the aforementioned pressing pierce 18c. When the first pressing member 18 is caused to rotate in the α2 and β2 directions in the drawing, the pressing piece 18c presses an actuator of the first switch SW1, or releases the actuator to enable on-off switching of the first switch SW1.

A motor M for driving individual members of the disk driving apparatus A is attached to the rear plate 16C of the main chassis 16. A reducing gear group 25 is connected to the driving shaft of the motor M, and the fan-shaped gear section 17d formed on the aforementioned driving lever 17 engages with a gear of this reducing gear group 25. More specifically the driving force of the motor M is transmitted via the reducing gear group 25, whereby the driving lever 17 is rotated in the α1 and β1 directions in the drawing.

Figure 4:
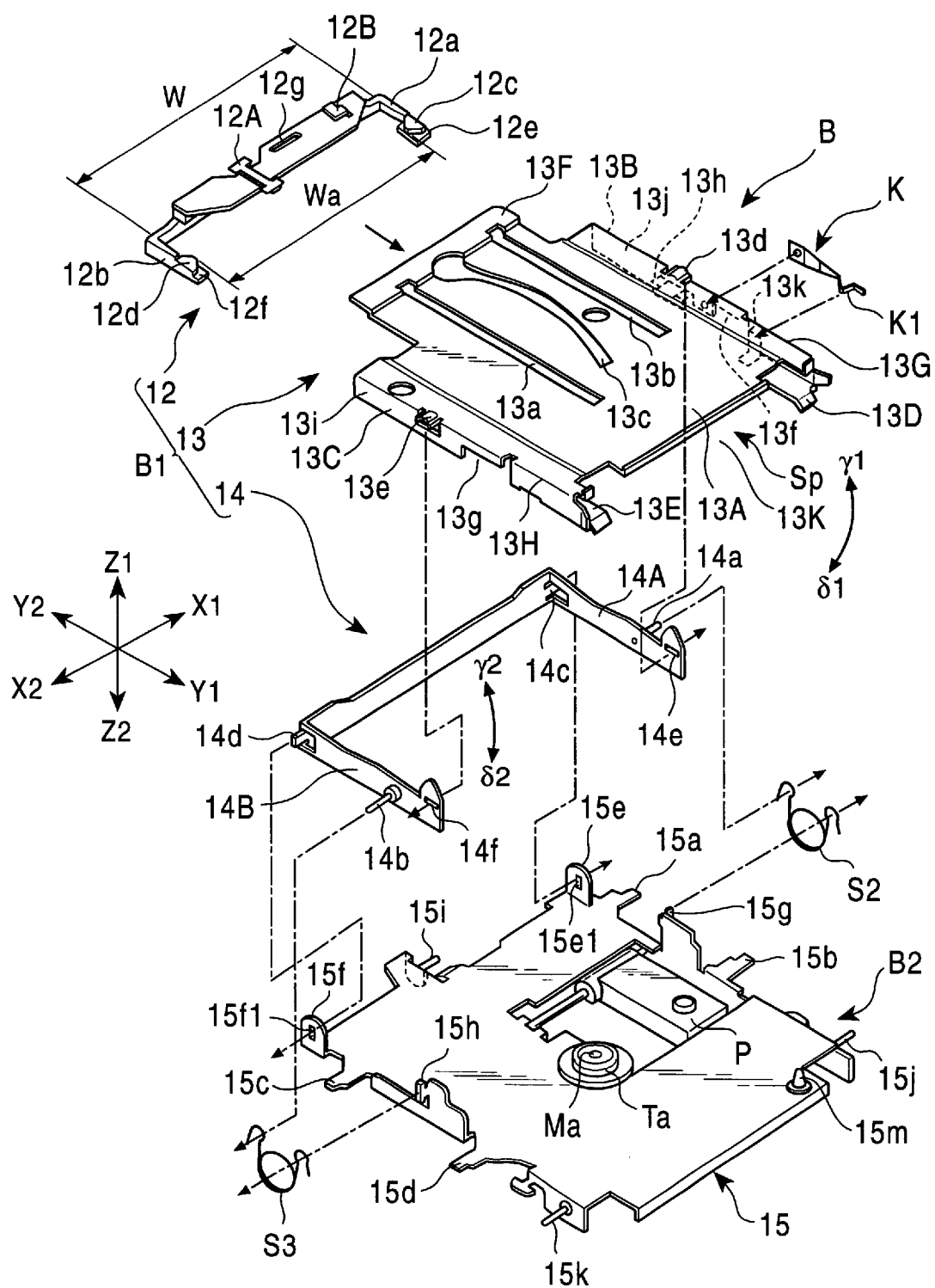
FIG. 4 is an exploded perspective view of a driving unit (disk holding driving section)

In the side plate 16B of the main chassis 16, there are pierced rectangular holes 16c and 16d receiving insertion of engaging projections (engagement section) 15a and 15b provided on a driving base 15 of a disk driving section B2 shown in FIG. 4, and a hole 16e receiving insertion of a lifting pin 14a provided in a projecting form on a lifting member 14 of a disk holding section B1 (FIG. 4).

A sliding plate 40 (sliding member) moving in the Y1–Y2 directions is provided along the side plate 16B on the side surface on the X1 side of the side plate 16B of the main chassis 16. Constraining holes (constraining sections) 41 and 42 and a transfer hole 43 opposed to the rectangular holes 16c and 16d and the hole 16e pierced in the side plate 16B are formed in the sliding plate 40. Play sections 41a, 42a and 43a receiving insertion of the engagement projections 15a, 15b of the driving base 15 and the lifting pin 14a of the lifting member 14 are pierced in the constraining holes 41 and 42 and the transfer hole 43. Constraining grooves 41b and 42b extending continuously in the Y2 direction from the play sections 41a and 42a are formed in the constraining holes 41 and 42, and a stopper groove (stopper section) 43b extending continuously in the Y2 direction from the play section 43a is formed in the transfer hole 43. The stopper groove 43b is formed at a position closer in the Z1 direction in the drawing, and an inclined cam section 43c is formed between the play section 43a and the stopper groove 43b.

A fixed chassis 22 formed by bending a metal sheet into a crosssectional shape of an L is provided on the X2 side in the drawing of the main chassis 16. The fixed chassis 22 comprises an upper plate 22A, a side plate 22B and a support 22C formed at a position slightly lower than the upper plate 22A in Z2 direction. An engagement piece 16f provided on the upper end edge of the rear plate 16C of the main chassis 16 is inserted into a rectangular hole 22h formed at the Y2 side end of the support 22C, and the leading end of the engagement piece 16f is firmly secured to the main chassis 16 through twisting, for example. In the aforementioned side plate 22B, there are pierced rectangular holes 22a and 22b receiving insertion of engaging projections (engagement section) 15c and 15d provided on the driving base 15 of the disk driving section B2 shown in FIG. 4, and a hole 22c receiving insertion of the lifting pin 14b provided in projection on the lifting member 14 of the disk holding section B1 shown in FIG. 4. On the Y1 side of the upper plate 22A, a positioning member (positioning section) 22g projecting from the upper plate 22A diagonally downward (in the Z1 direction) is formed.

A first sliding plate (moving member) 60 sliding in the Y1 and Y2 directions along the above-mentioned side plate 22B and a second sliding plate (moving member) 70 sliding along the first sliding plate 60 are provided on the X2 side of the fixed chassis 22.

The first sliding plate 60 comprises a metal sheet, and has pierced therein constraining holes (constraining sections) 61 and 62 and a transfer hole 63 facing the rectangular holes 22a and 22b and the hole 22c of the side plate section 22B. The constraining holes 61 and 62 reformed with the play sections 61a and 62a, and the constraining grooves 61b and 62b extending continuously in the Y1 direction in the drawing from the play sections 61a and 62a. The transfer hole 63 is formed with the play section 63a and the stopper groove (stopper section) 63b extending continuously in the Y1 direction in the drawing from the play section 63a. The stopper groove 63b is formed at a position closer to the Z1 direction, and an inclined cam section 63c is formed between the play section 63a and the stopper groove 63b.

The second sliding plate 70 is also formed by press-working of a metal sheet, and has an upper plate 70A and side plate 70B. As shown in FIG. 3, a long groove 74 extending in the Y direction and a driving groove 75 are formed in the upper plate 70A. The driving groove 75 as a whole is pierced into a cross-sectional shape of an L, and the leading end on the Y1 side in the drawing forms a transmitting section 75a extending in the Y2 direction. The leading end side of the driving groove 75 on the Y2 side in the drawing forms a relief section 75b having a width gradually increasing in a fan shape.

A constraining hole (constraining section) 71 and a transfer hole 73 facing the rectangular hole 22a and the hole 22c of the fixed chassis 22 are pierced in the side plate section 70B. The constraining hole 71 is formed from a play section 71a and a constraining groove 71b extending continuously in the Y1 direction in the drawing from the play section 71a. The transfer hole 73 is formed from a play section 73a and a stopper groove (stopper section) 73b extending continuously in the Y1 direction in the drawing from the play section 73a. The stopper groove 73b is formed at a position closer to the Z1 direction, and an inclined cam section 73c is formed between the play section 73a and the stopper groove 73b.

A force imparting member comprising a coil spring or the like represented by reference numeral S1 is stretched between the first sliding plate 60 and the second sliding plate 70. Of these, the first sliding plate 60 is imparted a force in the Y1 direction, and the second sliding plate 70 is imparted a force in the Y2 direction. In this state, the constraining hole 61 aligns with the constraining hole 71 (playing sections 61a and 71a, constraining grooves 61b and 71b); and the transfer hole 63 aligns with the transfer hole 73 (playing sections 63a and 73a, stopper grooves 63b and 73b). Therefore, the engaging projection 15c of the driving base 15 is inserted sequentially through the rectangular hole 22a of the fixed chassis 22, the constraining hole 61 of the first sliding plate 60, and then the constraining hole 71 of the second sliding plate 70, and the engaging projection 15d is likewise inserted sequentially through the rectangular hole 22b, and then the constraining hole 62. Similarly, the lifting pin 14b of the lifting member 14 is inserted sequentially through the hole 22c of the fixed chassis 22, the transfer hole 63 of the first sliding plate 60, and then the transfer hole 73 of the second sliding plate 70. Usually, while this state is maintained, the first sliding plate 60 and the second sliding plate 70 are made movable in the Y1–Y2 directions in the drawing.

When the aforementioned driving lever 17 rotates in the β1 direction, i.e., when the sliding plate 40 moves in the Y2 direction, the engagement projection 15a is positioned in the play section 41a of the constraining hole 41, the engagement projection 15b is positioned in the play section 42a of the constraining hole 42, and the lifting pin 14a is positioned in the play section 43a of the transfer hole 43, respectively. At this point, both the first sliding plate 60 and the second sliding plate 70 are moved in the Y1 direction counter to the Y2 direction which is the moving direction of the sliding plate 40. On the X2 side of the disk driving apparatus A, therefore, the engagement projection 15c is positioned in the play section 61a of the constraining hole 61 and the play section 71a of the constraining hole 71, the engagement projection 15d is positioned in the play section 62a of the constraining hole 62, and the lifting pin 14b is positioned in the play section 63a of the transfer hole 63 and the play section 73a of the transfer hole 73, respectively.

When the driving lever 17 is at a position at which it has turned in the α1 direction, the engagement projections (engagement sections) 15a, 15b, 15c and 15d and the lifting pins 14a and 14b are in a locked state, and the driving unit B (the holder 13, the lifting member 14 and the driving base 15) is in an elastically supported state by the elastic support members (the dampers 30, 31 and 32 and the coil spring) (see FIG. 7B).

When the driving lever 17 has turned in the α1 direction, i.e., when the sliding plate (moving member) 40 has moved in the Y1 direction, on the other hand, the engagement projection 15a enters the constraining groove 41b of the constraining hole 41, the engagement projection 15b enters the constraining groove 42b of the constraining hole 42, and the lifting pin 14a enters the stopper groove 43b of the transfer hole 43 on the X1 side of the disk driving apparatus A. On the X2 side of the driving apparatus, both the first sliding plate (moving member) 60 and the second sliding plate (moving member) 70 move in the Y2 direction, and the engagement projection 15c enters the constraining groove 61b of the constraining hole 61 and the constraining groove 71b of the constraining hole 71, the engagement projection 15d enters the constraining groove 62b of the constraining hole 62, and the lifting pin 14b enters the stopper groove 63b of the transfer hole 63 and the stopper groove 73b of the transfer hole 73, respectively.

As a result, when the driving lever 17 has turned in the α1 direction, all of the engagement projections (engagement sections) 15a, 15b, 15c and 15d and the lifting pins 14a and 14b are in a state constrained by the constraining grooves 41b, 42b, 61b, 71b and 62b and the stopper grooves (stopper sections) 43b, 63b and 73b, respectively. In other words, the holder 13, the lifting member 14 and the driving base 15 (driving unit B) provided with the engagement projections 15a, 15b, 15c and 15d and the lifting pins 14a and 14b are in a state fixedly supported by the sliding plate 40, the first sliding plate 60 and the second sliding plate 70, which are the moving members (see FIG. 7A). At this point, the holder 13, the lifting member 14 and the driving base 15 are constrained in the Y direction from the counter direction by the sliding plate 40, the first sliding plate 60 and the second sliding plate 70.

The constraining mechanism conducting the constraining and release of the driving unit (driving section) B within the enclosure 1 is composed of the constraining holes (constraining sections) 41, 42, 61, 62 and 71 of the sliding plate (moving member) 40, the first sliding plate (moving member) 60 and the second sliding plate (moving member) 70 and the engagement projections (engagement sections) 15a, 15b, 15c and 15d of the driving base 15.

The holder transfer mechanism which transfers the holder 13 (described later) in the Z2 direction (first direction) approaching the driving unit B and in the Z1 direction (second direction) is composed of the transfer holes 43, 63 and 73 of the sliding plate (moving member) 40, the first sliding plate (moving member) 60, the second sliding plate (moving member) 70 and the lifting member 14.

The lifting pins 14a and 14b of the lifting member 14 serve as coupling sections coupling the sliding plate 40, the first sliding plate 60 and the second sliding plate 70 with the holder 13.

A locking member represented by reference numeral 28 is provided inside (X1 side) the aforementioned fixed chassis 22. A supporting hole 28a is pierced at the center of the locking member 28. The locking member 28 is supported rotatably in the γ3 (position (a) in FIG. 7B) and the δ3 direction (position (b) in FIG. 7A) by the fixed chassis 22 as a result of insertion of a support section 22f formed by cutting the side plate 22B of the fixed chassis 22 and bending the support section 22f in the X1 direction. A stopper concave portion 28b is formed on the locking member 28. A stopper convex portion 65 projecting in the X1 direction in the drawing from the first sliding plate 60 is engaged with this stopper concave portion 28b. A constraining concave portion represented by reference numeral 28c is formed on the locking member 28. As a result of rotation of the locking member 28 in the δ3 direction, the engagement projection 15c of the driving base 15 is held by this constraining concave portion 28c, thus regulating movement in the Y1, Y2 and Z2 directions.

A supporting shaft 22d projecting in the Z1 direction in the drawing is provided on the upper plate 22A of the aforementioned fixed chassis 22. The supporting shaft 22d is inserted into the long groove 74 of the second sliding plate 70, and further, the leading end thereof is inserted into an insertion hole 26d of an intermediate arm represented by reference numeral 26, whereby the intermediate arm 26 is supported, around the supporting shaft 22d as a rotational center, rotatably in the α4 and β4 directions in the drawing. A regulating hole 22e is pierced in the upper plate 22A at a position closer to the Y2 side than the supporting shaft 22d. A regulating piece 27a formed by bending from a second pressing member 27 in the Z2 direction in the drawing is inserted into the regulating hole 22e. As a result, the second pressing member 27 is rotatable within a prescribed range in the α3 and β3 directions in the drawing.

A pressing section 27b is formed by bending on the second pressing member 27, and a second switch SW2 is provided at a position opposite to the pressing section 27b (see FIG. 1). More specifically, the second switch SW2 can be switched on-off as a result of the rotation of the second pressing member 27 in the α3 or β3 direction in the drawing. Further, a bent piece 27c is formed at the end of the second pressing member 27 on the Y1 side in the drawing, and this bent piece 27c is inserted into a guide groove 26a formed in the intermediate arm 26.

Figure 6A:
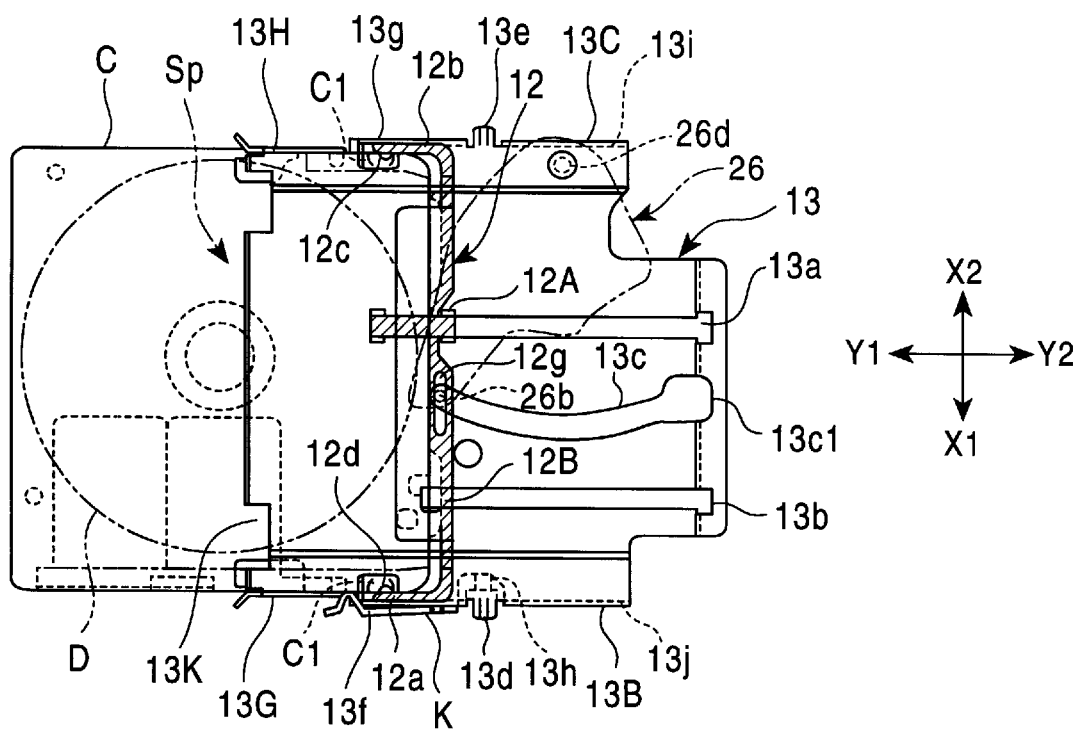
FIG. 6A is a plan view and FIG. 6B is a side view.
Figure 6B:
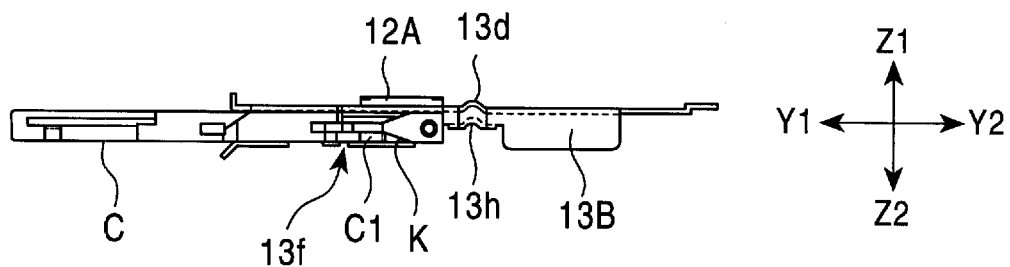

An insertion pin 26b extending in the Z2 direction in the drawing, and a rotated pin 26c positioned on the opposite side of the insertion pin 26b with the insertion hole 26d in between are provided on the intermediate arm 26. The insertion pin 26b is inserted into a relief groove 13c formed in the holder 13 of a disk holding section B1 shown in FIG. 4 and an engagement groove 12g of the holding member 12, and with rotation of the intermediate arm 26 in the α4–β4 directions, causes the holding member 12 to move in the Y1–Y2 directions (see FIG. 6). On the other hand, the rotated pin 26c is inserted into the driving groove 75 of the second sliding plate 70.

A support frame 29 is attached to the main chassis 16 on the Y1 side in the drawing, and a damper member 32 is secured to the inside surface of the support frame 29 on the X2 side. A convex-shaped positioning piece (positioning section) 29a projecting diagonally downward is formed on the upper surface of the support frame 29 on the X1 side in the drawing.

The aforementioned disk holding section B1 comprises a holding member 12, a holder 13 and a lifting member 14. The holding member 12 is, for example, made from a synthetic resin such as polyacetal by injection molding into a Π-shape. Holding arms 12a and 12b are formed at the both ends of the holding member 12 on the X1 and X2 sides as shown in FIG. 4. The holding arms 12a and 12b are elastically deformable in the X direction in the drawing, and at the leading ends thereof, holding projections 12c and 12d are integrally formed at positions opposite to each other.

Support sections 12e and 12f are integrally formed at the bottoms of the holding projections 12c and 12d (Z2 side). Further, sliding sections represented by reference numerals 12A and 12B project from the upper surface of the holding member 12, and the above-mentioned engagement groove 12g extends in the X direction and passes through in the Z direction. The Y-direction width of the engagement groove 12g is substantially equal to the diameter of the insertion pin 26b so that the holding member 12 in the state in which the insertion pin 26b is inserted into the engagement groove 12g is not loose in the Y direction. The width W between opposite inner surfaces of the holding arms 12a and 12b is substantially equal to the width Wc of the MD, and the distance Wa between the opposite surfaces of the holding projections 12c and 12d is smaller than the width W.

Driving base 15 supporting the holder 13, the lifting member 14 and the disk driving section B2 are formed by press-working metal sheets. The holder 13 has side plates 13B and 13C formed by bending both side ends of the upper plate 13A. The side plates 13B and 13C are also partially bent in a direction approaching each other, to serve as holding plates 13D and 13E guiding the lower surface of the MD. A step portion 13F is formed at the Y2 side end of the holder 13.

The end on the Y1 side of the holder 13 forms an opening 13K through which insertion and discharge of the MD are performed. This holder 13 guides movement of the MD in the Y1 and Y2 directions and serves to hold the housed MD.

In the holder 13, there is formed an inner area Sp surrounded by the upper plate 13A, the side plates 13B and 13C and the holding plates 13D and 13E, and the MD is housed in this inner area Sp. That is, the holder 13 serves as a guiding member which guides movement of the MD in the Y1–Y2 directions. The Y1 side ends of the upper plate 13A, the side plates 13B and 13C and the holding plates 13D and 13E and bent outward so as to permit easy guiding of the MD into the inner area Sp.

Guide grooves 13a and 13b linearly extending in the Y direction and a relief groove 13c allowing arcuate operation of the insertion pin 26b are formed on the upper plate 13A of the holder 13. A shown in FIG. 6A, the sliding sections 12A and 12B of the holding member 12 enter the guide grooves 13a and 13b, respectively, and the holding member 12 is supported movably in the Y-axis direction.

Support sections 13d and 13e extending in convex shapes project at the both sides of the upper plate 13A of the holder 13 in the X direction. An extrusion extending in the Z1 direction is formed on each of the upper surfaces of the support sections 13d and 13e, and the support sections 13d and 13e are inserted into supporting holes 14e and 14f of the lifting member 14. Partially notched notch portions 13f and 13g are formed in the side plates 13B and 13C of the holder 13. When the holding member 12 is at a standby position shown in FIGS. 6A and 6B (the sliding sections 12A and 12B of the holding member 12 are positioned at Y1 side ends of the guide grooves 13a and 13b), the side surface of the Y1 side of the holding arm 12a and the side surface of the X2 side of the holding arm 12b face the notch portions 13f and 13g. The portions of the side plates 13B and 13C on the Y2 side of the notched portions 13f and 13g serve as regulating sections 13i and 13j. When the holding member 12 moves from the above-mentioned standby position in the Y2 direction, the outside surfaces of the holding arms 12a and 12b slide in friction with the inner surfaces of the regulating sections 13i and 13j, or move in an opposite relationship with the regulating sections 13i and 13j via a fine gap.

A closing member K comprising a leaf spring made of a metal is secured to the outside of side plate 13B of the holder 13, and a part thereof on the free end side provides a transmitting section K1 formed by bending in the X2 direction. The transmitting section K1 projects into the inner area Sp of the holder 13 and can enter a rectangular hole G1 formed in the sputter G of the MD shown in FIG. 5. An opening piece 13h partially formed by bending in the X2 direction as shown by the dotted line in FIG. 4 is provided in the side plate 13B.

The lifting member 14 is formed by bending a metal sheet into substantially a Π-shape. The supporting arms 14A and 14B at both ends thereof have the lifting pins (transfer section) 14a and 14b projecting therefrom. The lifting pin (transfer section) 14a is inserted into a hole 16e in the side plate 16B of the main chassis 16 shown in FIG. 3 and the transfer hole 43 of the sliding plate (moving member) 40. Similarly, the lifting pin 14b is inserted into a hole 22c of the fixed chassis 22, the transfer hole 63 of the first sliding plate 60, and the transfer hole 73 of the second sliding plate 70.

The aforementioned supporting holes (connecting sections) 14e and 14f are pierced at the leading ends of the supporting arms 14A and 14B on the Y1 side in FIG. 4. The holder 13 and the lifting member 14 are coupled as a result of insertion of the support sections 13d and 13e of the holder 13 into the supporting holes (connecting sections) 14e and 14f. The holder 13 is supported rotatably in the γ1 and δ1 directions in the drawing with the support sections 13d and 13e as fulcra.

Convex portions (fulcra) represented by reference numerals 14c and 14d are formed on the Y2 side end of the lifting member 14. Support sections 15e and 15f are bending-formed on the Y2 side of the driving base 15. Substantially trapezoidal supporting holes 15e1 and 15f1 are pierced in these support sections 15e and 15f. The convex portions (fulcra) 14c and 14d of the lifting member 14 are inserted into the interior of these supporting holes 15e1 and 15f1. As a result, the lifting member 14 is supported slightly rotatably in the γ2 and δ2 directions in the drawing with the convex portions (fulcra sections) 14c and 14d as fulcra relative to the driving base 15, and the holder 13 and the driving base 15 (disk driving section B2) are connected together via the coupling section comprising the lifting member 14 and the lifting pins 14a and 14b thereof.

Engagement sections represented by reference numerals 15g and 15h are formed on the driving base 15. A force-imparting member S2 comprising a reversing spring is hooked between the engagement section 15g and the lifting pin 14a of the lifting member 14. Similarly, a force-imparting member S3 comprising a reversing spring is hooked as well between the engagement section 15h and the lifting pin 14b. The force-imparting members S2 and S3 are to impart a force in the Z1 or Z2 direction to the lifting pin 14a and 14b. That is, the force-imparting members S2 and S3 have the function of pressing the holder 13 onto the driving base side via the lifting member 14, and pushing up the holder 13 in a direction floating up from the driving base 15.

A spindle motor Ms (see FIGS. 8A and 8B) is attached to the lower surface of the driving base 15, and the rotation shaft Ma thereof projects on the upper surface side of the driving base 15, as shown in FIG. 4. A turntable Ta is secured to the leading end of the rotation shaft Ma. A pickup P moving linearly in the X1 and X2 directions relative to the turntable Ta is provided on the driving base 15. Further, a locator pin (locating member) 15m to be engaged into the positioning hole 3b formed in the lower surface of the MD (see FIG. 9) is provided on the Y1 side of the driving base 15 and projects in the Z1 direction.

The disk driving section B2 is composed of the aforementioned driving base 15, the spindle motor Ms arranged on the driving base 15, the turntable Ta, the pickup P and the locator pin 15m.

In the driving unit B comprising the disk holding section B1 and the disk driving section B2 having the configuration as described above, the supporting pins 15i, 15j and 15k provided on the driving base 15 are elastically supported by the elastic supporting members such as the dampers 30 and 31 provided in the main chassis 16 and the damper 32 provided on the support frame 29 (see FIGS. 8A and 8B). As such an elastic supporting member, for example, an oil damper sealing silicone oil is employed.

Further, an elastic supporting member such as a coil spring having an end engaged with the main chassis 16 or the fixed chassis 22 is provided at a position close to each of the dampers 30, 31 and 32. The other end of the coil spring is secured to the driving base 15 (not shown). More specifically, the unit B is elastically supported on the main chassis 16 by the dampers 30, 31 and 32, which are elastic supporting members, and elastically suspended by the coil spring which is an elastic supporting member.

Operations of the disk driving apparatus A mentioned above will now be described.

Standby State

In the standby state before insertion of the MD into the disk driving apparatus A, the driving lever 17 is at a position where engagement of the gear section 17d with the reducing gear group 25 has caused rotation most in the α1 direction. At this point, the driving piece 17a presses the transmitting section 44 of the sliding plate 40 in the Y1 direction, and the sliding plate (moving member) 40 is at a position where the sliding plate 40 has moved most in the Y1 direction.

In the disk driving apparatus A in a standby state, as shown in FIG. 7A, when the first sliding plate (moving member) 60 moves in the Y2 direction, the stopper convex section 65 pushes up the bottom 28d of the locking member 28 shown by a broken line in the Z1 direction. The locking member 28 therefore rotates in the δ3 direction around the supporting section 22f of the fixed chassis 22 to a position represented by (b). In this state (b), the engagement projection 15c of the driving base 15 is stopped by the constraining concave section 28c of the locking member 28.

In the standby state, the engagement projections (engagement sections) 15a and 15b of the driving base 15 enter the constraining grooves 41b and 42b, respectively, from the constraining holes (constraining sections) 41 and 42 of the sliding plate 40 and the play sections 41a and 42a.

Similarly, the lifting pin (transfer section) 14a of the lifting member 14 enters the stopper groove (stopper section) 43b of the transfer hole 43.

Because the stopper section 64 of the first sliding plate (moving member) 60 is pressed by the driving piece 17b of the driving lever 17 in the Y2 direction in the drawing, the second sliding plate (moving member) 70 coupled via a force imparting member S1 to the first sliding plate 60 is at the most distant position in the Y2 direction in the drawing. As a result, the engagement projection (engagement section) 15c enters the constraining groove 61b of the constraining hole (constraining section) 61 of the first sliding plate 60 and the constraining groove 71b of the constraining hole (constraining section) 71 of the second sliding plate 70 as shown in FIG. 7B. Similarly, the engagement projection (engagement section) 15d of the driving base 15 enters the constraining groove 62b of the constraining hole (constraining section) 62 of the first sliding plate 60. Further, the lifting pin (transfer section) 14b of the lifting member 14 enters the stopper groove (stopper section) 63b of the transfer hole 63 of the first sliding plate 60 and the stopper groove (stopper section) 73b of the transfer hole 73 of the second sliding plate 70.

More specifically, all the engaging projections (engagement section) 15a, 15b, 15c and 15d of the driving base 15 enter the constraining holes (constraining section) 41, 42, 61, 62 and 71, and the constraining grooves 41b, 42b, 61b, 62b and 71b. As a result, the driving base 15 is in a locked state in which the driving base 15 cannot move up and down (Z direction) or forward and back (Y direction). Similarly, the lifting member 14 also is in a locked state in which the lifting pins 14a and 14b are in the stopper grooves (stopper section) 43b, 63b and 73b of the transfer holes 43, 63 and 73.

These lifting pins 14a and 14b climb the inclined cam sections 43c, 63c and 73c of the transfer holes 43, 63 and 73, are lifted in the Z1 direction and enter the stopper grooves 43b, 63b and 73b. The lifting member 14 is thus rotated in the γ2 direction (see FIG. 4), and the holder 13 is held at a position shown in FIG. 2A, floating separated from the driving base 15 in the Z1 direction (second direction).

At this point, the upper plate 22A of the fixed chassis 22 and the support frame 29 having the positioning member (positioning section) 22g and 29a, respectively, are opposite to each other above the holder 13. At a position of the holder 13 floating up, as shown in FIG. 2A, the sides of the holder 13 come into contact with the positioning members 22g and 29g, respectively. As a result, the holder 13 is held so as not to move further in the X1 or X2 direction, rotation in the γ1 and γ1 directions (see FIG. 4) being inhibited.

In this state in which the holder 13 floats up from the driving base 15 and is held and positioned by the positioning members 22g and 29a, the holder 13 faces an insertion port 2 (see FIG. 9) provided on an enclosure 1 (see FIG. 9) of the MD player.

When the first sliding plate 60 and the second sliding plate 70 are moved in the Y2 direction, the rotated pin 26c of the intermediate arm 26 is engaged with the transmitting section 75a of the transmitting groove 75 and pushed in the Y2 direction. As a result, the intermediate arm 26 rotates in the α4 direction around the supporting shaft 22d, and the insertion pin 26b moves in the relief groove 13c of the holder 13 in the Y1 direction. The holding member 12 consequently moves to the standby position before movement in the Y1 direction by the insertion pin 26b (see FIG. 1). At this standby position, the holding arms 12a and 12b of the holding member 12 face the insides of the notches 13f and 13g formed in the side plates 13B and 13C of the holder 13.

Because, in the state before insertion of the MD, the driving lever 17 is at the extreme rotated position in the α1 direction, the convex portion 18b of the first pressing member 18 moves along the first rotation groove 17c1 of the driving groove 17c, and the first pressing member 18 is rotated in the α2 direction. As a result, the pressing piece 18c of the pressing member 18 is separated from the first switch SW1, and the first switch SW1 is in the off-state. More specifically, when the driving groove 17c has a middle portion 17c3 thereof positioned on a locus (or orbit) formed in a circular arc with a rotation hole 17e as the center, and the convex portion 18b of the first pressing member 18 is positioned in this middle portion 17c3, the first pressing member 18 is not driven, but kept in a rotating state in the β2 direction. The first rotation groove 17c1 and the second rotation groove 17c2 at the both ends of the driving groove 17c extend in inclination from the middle portion 17c3 in the X2 direction. Therefore, the first pressing member 18 is rotated in the α2 direction only when the convex portion 18b moves in the first rotation groove 17c1 and the second rotation groove 17c2 of the driving groove 17c.

In a state in which the intermediate arm 26 rotates in the α4 direction as shown in FIG. 1, on the other hand, the bent piece 27c of the second pressing member 27 enters the first arcuate groove 26a1 on the Y2 side of the guide groove 26a. The second pressing means 27 is therefore rotated in the β3 direction. As a result, the pressing section 27b presses the second switch SW2 to bring the second switch SW2 into the on-state.

Introducing Operation of Recording Medium

When the holder 13 is at the aforesaid standby position, it is possible to insert the MD into the opening 13K of the holder 13 through the insertion port 2, or discharge the MD held in the holder 13 from the insertion port 2.

Figure 5:
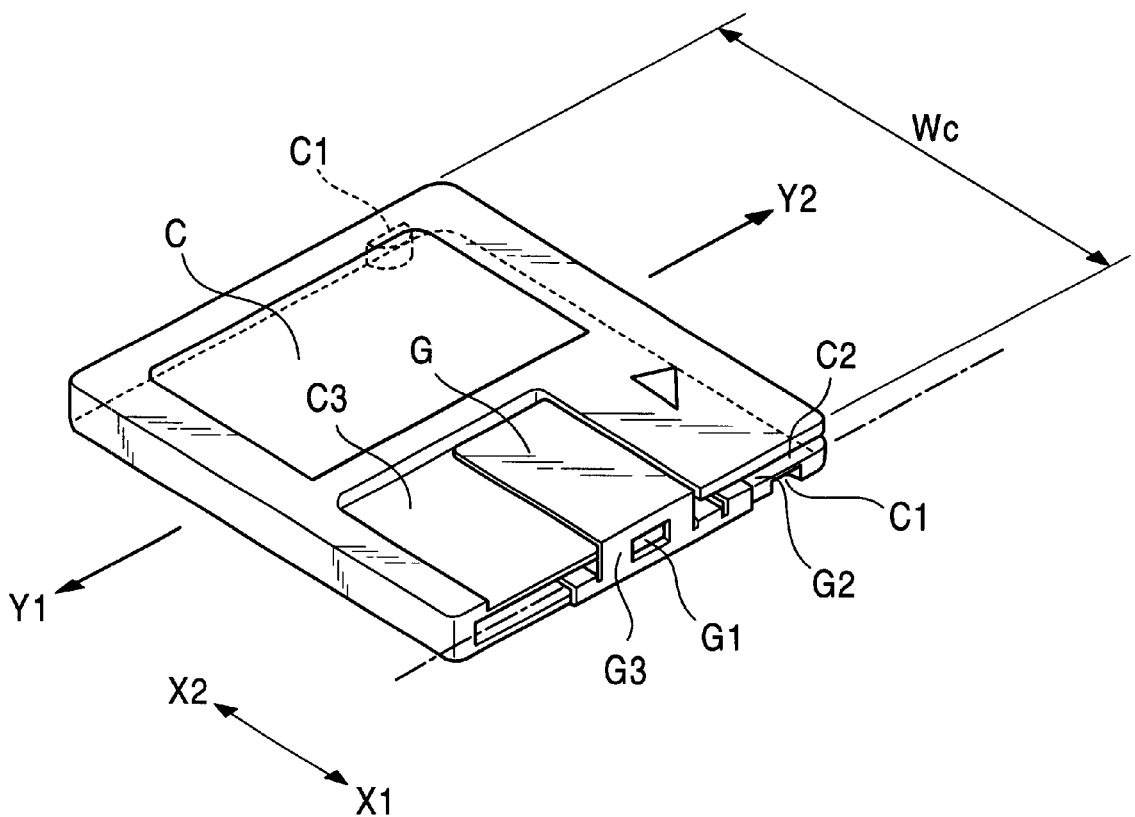
FIG. 5 is a perspective view illustrating a MD (mini-disk)

As shown in FIGS. 5 and 6, the MD which is a recording medium has an outside covered with a cartridge C, and a photomagnetic disk D is rotatably provided in this cartridge C. A shutter G is provided slidably in the Y1 and Y2 directions on the MD. By moving the shutter G in the Y1 direction, the photomagnetic disk D provided inside is exposed, and ready for recording or reproducing information. Concave portions C1 and C1 are provided on the lower surfaces of both sides of the leading end (on the Y2 side) in the inserting direction of the MD. As described above, the width Wc of the MD is equal to, or slightly smaller than, the width W between the holding arms 12a and 12b of the holding member 12, and larger than the distance Wa between the holding projections 12c and 12d.

As shown in FIG. 6, at the standby position where the holding member 12 has moved most in the Y1 direction, the holding arms 12a and 12b of the holding member 12 face the insides of the notches 13f and 13g formed on the side plates 13B and 13C of the holder 13. As a result, both the holding arms 12a and 12b are allowed to elastically deform in the X-axis direction, thus permitting expansion of the width between the holding arms 12a and 12b.

When insertion of the MD into the inner area Sp of the holder 13 is started, both sides of the leading end of the MD first come into contact with the holding projections 12c and 12d provided at the leading ends of the holding arms 12a and 12b. With the insertion of the MD, the holding arms 12a and 12b elastically deform in the X-axis direction to enter the notches 13f and 13g. As a result, the distance Wa between the holding projections 12c and 12d is expanded, so that the leading end of the MD can pass through between the holding projections 12c and 12d. Further, when the MD is inserted, the holding projections 12c and 12d enter the concave portions C1 and C1 at both sides of the MD under the effect of the elastic restoring force of the holding arms 12a and 12b. As a result, the MD is softly stopped from both sides by the holding member 12 and held. When the leading end side of the MD comes into contact with the holding projections 12c and 12d of the holding member 12, a pressing force acts in the Y2 direction on the holding member 12. Since the holding arms 12e and 12d elastically deform in the X-axis direction with a force smaller than the imparted force of the force imparting member giving a force in the α4 direction to the intermediate arm 26, the holding member 12 is held at the standby position.

When the MD is further pushed in from this state in the Y2 direction, the holding member 12 is pressed in the Y2 direction. The insertion pin 26b of the intermediate arm 26 is inserted in the engagement groove 12g of the holding member 12. Therefore, as a result of movement of the holding member 12 in the Y2 direction under pressing, the insertion pin 26b is pressed against the inner wall of the engagement groove 12g, thus causing rotation of the intermediate arm 26 in the β4 direction. Upon rotation of the intermediate arm 26 in the β4 direction, the rotated pin 26c engaged with the transmitting section 75a of the second sliding plate 70 presses the second sliding plate 70 in the Y1 direction via the transmitting section 75a.

At this point, the driving piece 17b of the driving lever 17 is engaged with the transmitting section 64 of the first sliding plate 60, and the gear 17d of the driving lever 17 engages with the gear of the reducing gear group 25 into a fixed state in which rotation thereof is limited. As a result, only the second sliding plate 70 that is slidable relative to the first sliding plate 60 is moved in the Y1 direction by the rotated pin 26c.

A force imparting member S1 is provided between the first sliding plate 60 and the second sliding plate 70, and under the effect of movement of the second sliding plate 70, the force imparting member S1 is stretched against the imparting force thereof. As a result, even when, after insertion of the MD into the inner area Sp of the holder 13 and the start of rotation of the intermediate arm 26 in the β4 direction, restoration of the force imparting member S1 to the original contracting state causes the second sliding plate 70 to return in the Y2 direction, whereby the intermediate arm 26 is rotated in the α4 direction, thus permitting return of the holding member 12 to the initial standby position (where it has moved the most in the Y1 direction).

When the MD is further pushed in and the intermediate arm 26 rotates in the β4 direction, the bent portion 27c of the second pressing member 27 moves in the first arcuate groove 26a of the intermediate arm 26, and then enters the guide groove 26a.

At this point, as shown in FIG. 1, the second pressing member 27 is rotated slightly in the α3 direction along the first arcuate groove 26a1. As a result, the pressing section 27b leaves the second switch SW2 which is changed over to the off-state. The off-state of the second switch SW2 is maintained until the completion of the introducing operation of the MD.

The change in state of the second switch SW2 is transmitted to a control section not shown such as a microcomputer installed in the player. The control section detects insertion of the MD from the change in state of the second switch SW2, and the motor M is started via a motor driver not shown.

The rotation driving force of the motor M is transmitted to the gear 17d of the driving lever 17 via the reducing gear group 25, and causes the driving lever 17 to rotate in the β1 direction. As a result, the first sliding plate 60 and the second sliding plate 70 connected via the force imparting member S1 are both moved in the Y1 direction. At this point, the transmitting section 75a of the upper plate 70A of the second sliding plate 70 moves in the Y1 direction while engaging with the rotated pin 26c of the intermediate arm 26. As a result, the intermediate arm 26 is further rotated in the β4 direction around the supporting shaft 22d, and the holding member 12 is withdrawn in the Y2 direction.

The MD is held between the holding arms 12a and 12b of the holding member 12, and the MD, as well as the holding member 12, is withdrawn in the Y2 direction. More specifically, when a prescribed amount of MD is inserted into the inner area Sp of the holder 13, the MD is thereafter automatically drawn into the disk driving apparatus A under the effect of the rotation driving force of the motor M.

Upon movement of the holding member 12 in the Y2 direction, the holding arms 12a and 12b come off the positions facing the notches 13f and 13g of the holder 13 and move into the Y2 direction. The holding arms 12a and 12b move while sliding on the inner surfaces of the regulating sections 13i and 13j formed rearward (Y2 side) of the notches 13f and 13g of the side plates 13B and 13C of the holder 13, or while facing the regulating sections 13i and 13j with a slight gap in between.

As a result, the holding arms 12a and 12b are regulated from elastic deformation toward opening in the X-axis direction while being constrained by the regulating sections 13i and 13j. More specifically, the width W between the holding arms 12a and 12b and the distance Wa between the holding projections 12c and 12d can be kept substantially constant. The holding projections 12c and 12d therefore never come out of the concave portions C1 and C1 of the MD, and the MD is pulled in by the holding member 12 in the Y2 direction without fail.

When the MD is deformed, for example, transfer may be started in a state in which the holding projection 12c or 12d cannot securely enter the concave portion C1 of the MD. In this case, the transfer operation of the MD is carried out while the holding arms 12a and 12b are kept at the notches 13f and 13g of the holder 13. When the outside surfaces of the holding arms 12a and 12b come into contact with the regulating sections 13j and 13i of the side plates 13B and 13C, a pressing force acts inwardly. As a result, the holding projection 12c or 12d forcibly enters the inside of the concave portion C1.

As a result, the MD is firmly held by the holding member 12, guided in the holder 13, and introduced with certainty onto the disk driving section B2.

When the holder 13 is at an elevated standby position after ascending in the Z1 direction, as shown in FIG. 8A, the leading end of the locator pin (locating member) 15m on the driving base 15 is at a position below (on the Z2 side) the lower surface of the cartridge of the MD (not shown in FIGS. 8A and 8B) held in the holder. Similarly, the upper end of the turntable Ta is at a position below the lower surface of the cartridge C of the MD moving within the holder 13. As a result, the MD in the holder 13 is held by the holding member 12, and can move in the Y1 and Y2 directions in the holder 13 without coming into contact with the leading end of the locator pin 15m or the upper end of the turntable Ta.

Immediately upon the completion of movement of the holding member 12 holding the MD in the Y2 direction, and introduction of the MD to a prescribed position on the disk driving section B2, or simultaneously with the completion of transfer of the holding member 12 in the Y2 direction, rotation of the driving lever 17 in the β1 direction causes the sliding plate (moving member) 40 to move in the Y2 direction. The lifting pin (transfer section) 14a of the lifting member 14 descends from the stopper groove (stopper section) 43b of the transfer hole 43 through the inclined cam section 43c to the play section 43a.

Similarly, because the first sliding plate (moving member) 60 and the second sliding plate (moving member) 70 move in the Y1 direction, the lifting pin (transfer section) 14b of the lifting member 14 descends from the stopper grooves 63b and 73b of the transfer holes 63 and 73 through the inclined cam sections 63c and 73c to the play sections 63a and 73a.

When the lifting pins 14a and 14b are brought down through the inclined cam sections 43c, 63c and 73c of the transfer holes 43, 63 and 73, the lifting member 14 thereafter receives a rotational force from the force imparting members S2 and S3 comprising reversing springs. As a result, the holder 13 connected to the lifting member 14 via the supports 13d and 13e and the MD housed in the holder 13 are brought down in the Z2 direction (first direction). At this point, when the MD is inserted in the normal direction and posture into the holder 13, the clamping plate Cp of the photomagnetic disk in the MD (see FIG. 9) is attached (magnetically attracted) onto the turntable Ta provided on the driving base 15, and simultaneously, the locator pin (locating member) 15m of the driving base 15 engages with the positioning hole 3b on the lower surface of the MD (see FIG. 9), thereby solidly positioning the cartridge C of the MD on the driving base 15.

Simultaneously with this, the engagement projections (engagement sections) 15a and 15b of the driving base 15 move through the constraining grooves 41b and 42b of the constraining holes (constraining sections) 41 and 42 of the sliding plate (moving member) 40 to the play sections 41a and 42a, respectively. The engagement projections (engagement sections) 15c and 15d of the driving base 15 as well move through the constraining grooves 61b, 71b and 62b of the constraining holes (constraining sections) 61, 71 and 62 of the first sliding plate (moving member) 60 and the second sliding plate (moving member) 70 to the play sections 61a, 71a and 62a.

When the first sliding plate 60 and the second sliding plate 70 move in the Y1 direction, the stopper convex section 65 of the first sliding plate 60 slides against the bottom 28d of the locking member 28 in the Y1 direction, and enters the stopper concave section 28b of the locking member 28. As a result, pushup of the locking member 28 by the stopper convex section 65 in the δ3 direction is released, into a state represented by reference numeral (a) in FIG. 7B in which the locking member 28 has turned in the γ3 direction. This causes the constraining concave section 28c of the locking member 28 to leave the engagement projection 15c of the driving base 15, thus releasing constraint of the driving unit B by the constraining concave section 28c.

For the driving unit B, constraint of all the engaging projections (engagement section) 15a, 15b, 15c and 15d and the lifting pins (transfer section) 14a and 14b is released into a non-locked state. As a result, the driving unit B is elastically supported in the X, Y and Z directions by the elastic supporting members such as the aforementioned dampers 30, 31 and 32 and coil springs (not shown) within the fixed portions (inner of enclosure) such as the main chassis 16 and the fixed chassis 22.

When the holder 13 descends in the Z2 direction (first direction), the holding member 12 provided slidably relative to the holder 13 also descends integrally therewith. The engagement groove 12g into which the insertion pin 26b is inserted also descends along with the insertion pin 26b. The insertion pin 26b has a length sufficient to prevent the descending holding member 12 from coming out of the engagement groove 12g.

During introduction of the MD into the holder 13 while being held by the holding member 12, an opening piece 13h formed in the holder 13 enters the guide groove C2 on the side surface of the MD on the X1 side (see FIG. 5), and releases a locking member (not shown) provided in the MD. The opening piece 13h presses the transmitting section G2 of the shutter G in the Y1 direction. The shutter G is released along with the introducing operation, opening the opening window of the MD, and the photomagnetic disk D is thus exposed. Upon mounting of the clamping plate Cp of the photomagnetic disk D onto the turntable Ta, the recording surface of the photomagnetic disk D exposed from the opening window of the MD faces the pickup P (see FIG. 4), thus completing the introducing operation of the MD.

Upon the completion of the introducing operation of the MD, the driving lever 17 has rotated most in the β1 direction. At this point, the convex portion 18b of the pressing member 18 enters the second rotation groove 17c2 in the driving groove 17c of the driving lever 17. The first pressing member 18 is consequently rotated in the α2 direction, and the pressing piece 18c leaves the first switch SW1. The first switch SW1 is changed over to the off-state.

The aforementioned control section (not shown) detects the completion of the introducing operation of the MD by detecting the change in state of the first switch SW1 into off-state. In the control section, the photomagnetic disk D in the MD is rotated by rotatably driving a spindle motor Ms, and causing the pickup P to slide in the X-axis direction (see FIG. 5), to perform reproduction or recording of information. At this point, since the driving unit B is elastically supported within the enclosure by the elastic supporting member such as the dampers 30, 31 and 32, vibration or impact acting on the enclosure 1 does not directly affect the driving unit B, thus preventing sound skip of the reproduced output caused by the pickup P.

When the MD is inserted in an abnormal direction or posture (surface/back reversed or length/width reversed) into the holder 13 at the standby position shown in FIG. 8A, the center of the clamping plate Cp of the MD does not agree with the center of the turntable Ta, and the positioning hole 3b formed in the MD cartridge is out of alignment with the locator pin (locating member) 15m.

When the holder 13 descends in the Z2 direction (first direction) in this state, a portion other than the clamping plate Cp of the MD may hit the upper surface of the turntable, or the lower surface of the cartridge may collide with the locator pin (locating member) 15m.

However, in the aforementioned disk driving apparatus A, as shown in FIG. 8B, the engagement projections (engagement sections) 15c and 15d provided on the driving base 15 escape completely from the constraining grooves 61b, 71b and 62b of the constraining holes (constraining sections) 61, 71 and 62, immediately after the lifting pin (transfer section) 14b enters from the stopper grooves (stopper sections) 63b and 73b of the transfer holes 63 and 73 into the inclined cam sections 63c and 73c along with movement of the first sliding plate (moving member) 60 and the second sliding plate (moving member) 70 in the Y1 direction. Similarly, on the X1 side in the drawing of the driving unit B, the engagement projections (engagement sections) 15a and 15b of the driving base 15 escape completely from the constraining grooves 41b and 42b of the constraining holes (constraining sections) 41 and 42 immediately after the lifting pin (transfer section) 14a enters from the stopper groove (stopper section) 43b of the transfer hole 43 into the inclined cam section 43c as a result of move of the sliding plate 40 (moving member) in the Y2 direction. More specifically, when the lifting pins (transfer sections) 14a and 14b approach the upper portions of the inclined cam sections 43c, 63c and 73c of the transfer holes 43, 63 and 73, the holder 13 begins to slightly descend via the lifting member 14. The shape and position of arrangement of the transfer hole 43, the constraining holes 41 and 42, the transfer holes 63 and 73 and the constraining holes 61, 71 and 62 are respectively set so that the engagement projections (engagement sections) 15a, 15b, 15c and 15d can completely escape from the constraining grooves 41b, 42b, 61b, 71b and 62b of the constraining holes (constraining sections) 41, 42, 61, 71 and 62 before the MD in the holder 13 hits the turntable Ta or a locator pin (locating member) 15m.

By slightly modifying the shape or the position of arrangement of the transfer hole 43, the constraining holes 41 and 42, the transfer holes 63 and 73 and the constraining holes 61, 71 and 62, it is also possible to ensure that the engagement projections (engagement sections) 15a, 15b, 15c and 15d of the driving base 15 completely escape from the constraining grooves 41b, 42b, 61b, 71b and 62b of the constraining holes (constraining sections) 41, 42, 61, 71 and 62 at a time point when the lifting pins (transfer sections) 14a and 14b are still in the stopper grooves (stopper sections) 43b, 63b and 73b of the transfer holes 43, 63 and 73, immediately after the sliding plate (moving member) 40 begins moving in the Y2 direction from the constrained state shown in FIG. 8A, and the first sliding plate (moving member) 60 and the second sliding plate (moving member) 70 begin moving in the Y1 direction.

When the shape and the position of arrangement of the transfer hole 43, the constraining holes 41 and 42, the transfer holes 63 and 73 and the constraining holes 61, 71 and 62 are set as described above, it is possible to bring the driving base 15 into an elastically supported state within the enclosure through release of constraint in the vertical direction (Z direction) of the driving base 15 (disk driving section B2) by the sliding plate 40, the first sliding plate 60 and the second sliding plate 70, which are moving members, before the MD held in an abnormal direction or posture in the holder 13 collides with the turntable Ta or the locator pin (locating member) 15m upon descent of the holder 13.

As a result, when the holder 13 further descends after the MD comes into contact with the turntable Ta or the locator pin 15m, the pressing force imparted by the MD to the turntable Ta or the locator pin 15m is alleviated by deformation of the dampers 30, 31 and 32 elastically supporting the driving base 15. It is thus possible to prevent a positional shift of the turntable Ta relative to the rotation shaft Ma of the spindle motor or deformation of the MD cartridge C.

When the MD is inserted in an abnormal posture or direction in the holder 13, the MD in the holder 13 comes into contact with the turntable Ta or the locator pin 15m, and the holder 13 cannot sufficiently approach the driving base 15. As a result, the detecting switch (see FIG. 9) on the driving base 15 cannot detect the completion of MD loading. The control section (not shown) detects the insertion of the MD from a change in state of the second switch SW2, and then causes a transfer to the discharge operation by judging that the MD has been erroneously inserted when the state of the detecting switch 7 is not switched over within a prescribed period of time. In place of the detecting switch 7, erroneous insertion of the MD may be determined when a signal of the photomagnetic disk in the MD cannot be read by the pickup P within a prescribed period of time (focus support of the pickup is inoperative).

In the aforementioned disk driving apparatus A, the transfer hole 43 and the constraining holes 41 and 42 are formed on the same sliding plate 40. Similarly, the transfer hole 63 and the constraining holes 61 and 62 are formed on the first sliding plate 60, and the transfer hole 73 and the constraining hole 71 are formed on the second sliding plate 70. It is therefore easier to set with high accuracy the shape and the position of arrangement of the transfer holes 43, 63 and 73 (setting timing of the up-down operation of the holder 13) and the constraining holes 41, 42, 61, 62 and 71 (setting timing for switching over the disk driving section B2 between constrained and non-constrained states). More specifically, the accuracy of the shape and the position of arrangement of the transfer holes 41, 42, 61, 62 and 71 and the constraining holes (constraining sections) 41, 42, 61, 62 and 71 can be set within the size tolerance of press fabrication of the sliding plate 40, the first sliding plate 60 and the second sliding plate 70, which are moving members. As a result, it is possible to set a delicate timing for releasing the constrained state of the disk driving section B2 immediately before the holder 13 begins descending and the MD in the holder 13 comes in contact with the turntable Ta or the locator pin (locating member) 15m. It is therefore not necessary to ensure a very large gap between the MD in the holder 13 and the turntable Ta or the locator pin 15m, thus permitting achievement of a reduced thickness for the disk driving apparatus A as a whole.

The transfer hole 43 causing the holder 13 to move up or down and the constraining holes 41 and 42 performing constraint and non-constraint of the disk driving section B2 may be formed on separate members, and similarly, the transfer hole 63 and the constraining holes 61 and 61, and the transfer hole 73 and the constraining hole 71 may be formed on separate members so that these members operate in an interlocking relationship.

In the aforementioned disk driving apparatus A, the pressing force applied by the MD inserted in an abnormal posture into the holder 13 and descending to the turntable Ta is alleviated, thus eliminating the risk of a positional shift of the turntable Ta relative to the rotation shaft Ma. It is therefore not necessary to very firmly secure the turntable Ta and the rotation shaft Ma; these parts may be secured, for example, by means such as an adhesive. It is also possible to use a turntable Ta made of, not a metal, but a synthetic resin through injection molding.

If the turntable Ta can be made of a synthetic resin as described above, it is possible to form a shaft hole and screw holes Ta1 and Ta2 (see FIG. 9) simultaneously with injection molding of the turntable Ta. That is, it is not necessary to additionally fabricate a shaft hole and screw holes after fabrication of the exterior shape. It is thus possible to simplify the manufacturing process of the turntable Ta and reduce the fabrication cost.

In a recording medium such as a MD, in general, the clamping plate Cp of the photomagnetic disk D in the cartridge C is made of an alloy containing a magnetic material, and the clamping plate Cp is attracted with the magnetic attracting force of a permanent magnet buried in the upper surface of the turntable Ta. If the above-mentioned turntable made of a synthetic resin can be used, a permanent magnet may be inserted upon injection molding of the turntable Ta. As a result, it is possible to eliminate the process of securing the permanent magnet by bonding after cutting fabrication, as is necessary for a metal turntable, and thus further simplify the manufacturing process of the turntable.

When a synthetic resin turntable Ta is used and it is necessary to firmly attach the turntable Ta to the rotation shaft Ma of the spindle motor Ms, it suffices to bury a metal bushing having a shaft hole at the center of the turntable Ta through insert-forming, and pressure-attach the shaft hole of the bushing onto the rotation shaft Ma of the spindle motor Ms.

Discharging Operation of Recording Medium

The discharging operation of the MD is started, for example, by operating an eject button provided on the front panel of the MD player, and carried out in steps in reverse sequence of the introducing operation described above.

More specifically, upon operation of the eject button the signal is communicated to the control section where the motor M is started through a motor driver (not shown) in a direction counter to that of the aforementioned introducing operations. The rotational driving force of the motor M is transmitted via a reducing gear group 25 to the gear section 17d of the driving lever 17 to rotate the driving lever 17 in the α1 direction. As a result, on the X1 side of the driving unit B, the sliding plate (moving member) 40 is caused to move in the Y1 direction. On the X2 side of the driving unit B, on the other hand, both the first sliding plate (moving member) 60 and the second sliding plate (moving member) 70 coupled via the force imparting member S1 are moved in the Y2 direction.

Upon movement of the first sliding plate 60 and the second sliding plate 70 in the Y2 direction, the stopper convex section 65 of the first sliding plate 60 escapes from the stopper concave section 28b of the locking member 28, pushes up the bottom 28d of the locking member 28 in the Z1 direction, and the locking member 28 is caused to rotate in the 83 direction around the supporting section 22f of the fixed chassis 22 (the state indicated by (a)). As a result, the constraining concave section 28c of the locking member 28 stops the engagement projection 15c of the driving base 15, thus constraining movement of the driving base 15 in the Y direction. Stoppage of the engagement projection 15c by the constraining concave section 28c is to preliminarily constrain the driving unit B, regulating the movement of the driving unit B in the Y1, Y2 and Z2 (downward) directions. That is, there is achieved a preliminary locked state in which the driving unit B is movable only in the Z1 (upward) and X (width direction or right/left direction) directions.

The locking member 28 is provided not only on the X2 side, but also on the X1 side, so that movement of the sliding plate 40 in the Y1 direction causes the engagement projection 15a or 15b to be constrained. That is, the driving unit B is preliminarily locked by the locking member on both sides.

Thereafter, when the first sliding plate 60 and the second sliding plate 70 are caused to move in the Y2 direction, and the sliding plate 40 is moved in the Y1 direction, the lifting pins (moving members) 14a and 14b climb the inclined cam sections 43c, 63c and 73c of the transfer holes 43, 63 and 73 and move into the stopper grooves (stopper sections) 43b, 63b and 73b. Therefore, after the lifting member 14 rotates in the y2 direction and the holder 13 is lifted in the Z1 direction (second direction) leaving the driving base 15, movement of the coupling section comprising the lifting pins 14a and 14b and the lifting member 14 having these lifting pins 14a and 14b provided thereon in the Z direction is constrained. Simultaneously, for the holder 13, the upper edge 13G of the upper plate 13A on the X1 side comes into contact with the positioning piece (positioning section) 29a of the supporting frame 29, and similarly, the upper edge 13H of the upper plate 13A on the X2 side comes into contact with the positioning piece (positioning section) 22g of the fixed chassis 22. Upon coming into contact, the holder 13 receives an imparted force in the γ1 direction by reversing springs S2 and S3. The upper edge 13G and the upper edge 13H of the holder 13 press the positioning pieces 29a and 22g, respectively.

As shown in FIGS. 2 and 3, the positioning pieces (positioning sections) 22g and 29a tilt toward the Z direction and the X direction. As a result, as shown in FIG. 2A, reaction forces F2 and F1 produced by the pressing of the positioning pieces 29a and 22g on the upper edges 13G and 13H act in the directions shown by the arrows, perpendicular to the angles of the positioning pieces 29a and 22g. Movement of the holder 13 in the Z (height) direction is regulated by the Z-direction components of the reaction forces F1 and F2, and movement in the X (right-left or width) direction is regulated by the X-direction components of the reaction forces F1 and F2.

Therefore, movement of the holder 13 not only constrained in the Z direction but it also is constrained in the X direction with a simple configuration in which the holder 13 is moved in the Z1 direction so that the upper edges 13G and 13H thereof press the positioning pieces 29 and 22g, respectively. This eliminates the necessity of special constraining members for regulating movement of the holder 13 in the X direction.

The engagement projections 15a, 15b, 15c and 15d of the driving base 15 enter the constraining grooves 41b, 42b, 61b, 71b and 62b of the constraining holes 41, 42, 61, 71 and 62 of the sliding plate 40, the first sliding plate 60 and the second sliding plate 70, respectively, and this ensures complete constraint of the driving unit B in the Z direction and the Y direction.

That is, in the state in which the driving unit B is completely constrained by the positioning pieces (positioning sections) 29a and 22g, the sliding plate (moving member) 40, and the first and second sliding plates (moving members) 60 and 70, movement of the driving unit B is regulated in all of the X, Y and Z directions, and the driving unit B is fixed in the enclosure.

As a result, it is possible to cause the Y1 side end of the holder 13 to face the insertion port 2 of the MD player (see FIG. 9). It is therefore possible to prevent occurrence of the inconveniences of the corner of the MD getting caught by the edge of the insertion port 2 or the edge of the holder 13 at the Y1 side end upon discharge of the MD. It is thus possible to smoothly carry out discharge of the recording medium such as a MD from the holder 13 to the insertion port 2 and insertion thereof from the insertion port 2 to the holder 13.

When the holder 13 is lifted, the upper edge 13G and the upper edge 13H of the holder 13 come into contact with the positioning pieces 29a and 22g to permit positioning at a position accurately facing the insertion port 2. This eliminates the necessity of special positioning members for positioning the holder 13 in all directions, thus permitting downsizing of the disk driving apparatus A as a whole.

By providing the positioning pieces 22g and 29a at positions near the insertion port 2 of the disk driving apparatus A on the Y1 side, it is possible to cause the Y1 side end of the holder 13 to face accurately the insertion port 2.

By the movement of the second sliding plate 70 in the Y2 direction, the rotated pin 26c of the intermediate arm 26 is arrested by the stopper section 75a of the stopper groove 75 and pushed in the Y2 direction in the drawing. As a result, the intermediate arm 26 rotates in the α4 direction around the axis 22d, and the insertion pin 26b moves in the Y1 direction in an escape groove 13c of the holder 13. As a result, the MD is transferred toward the insertion port 2 (Y1 direction) by the rotation of the intermediate arm 26 in the α4 direction while being held by the holding member 12.

The holding member 12 is transferred to the standby position where the holding arms 12a and 12b oppose the notches 13f and 13g of the holder 13. At this point, the leading end of the MD on the Y1 side projects from the insertion port 2. The MD can be easily taken out by grasping and drawing it out in the discharging direction (Y1 direction).

In the above-mentioned embodiment, the holder 13 has been positioned through direct contact of the holder 13 with the positioning pieces 29a and 22g which serve as positioning sections. Positioning of the holder 13 may be accomplished by positioning the lifting member 14 when the lifting member 14 lifting the holder 13 in the γ1 and δ1 directions is lifted in the γ2 direction. In this case, movement of the lifting member 14 and the holder 13 in the X direction and Z direction is regulated by, for example, forming long grooves having a width substantially equal to the thickness of the lifting member 14 and having a prescribed length in the Y direction on the fixed chassis 22 and the supporting frame 29 so that the upper surface of the lifting member 14 at the Y1 side end is engaged with the long groove upon movement of the lifting member 14 in the γ2 direction.

According to the present invention, as described above in detail, even when the recording medium is inserted from the insertion port in an abnormal state, the pressing force exerted by the recording medium onto the turntable or the locating member cam be alleviated by the elastic supporting members supporting the driving section and it is possible to prevent deformation or a positional shift or deformation of, or damage to, the recording medium.

By providing the holder transfer mechanism lifting the holder and the constraining mechanism constraining the driving section on the same moving member, it is easier to set a proper timing of the descent of the holder and the release of locking of the driving section.

What is claimed is:

1. A recording medium driving apparatus comprising
   an enclosure having an insertion port for insertion and discharge of a recording medium;
   a holder holding the recording medium inserted through said insertion port;
   a driving section having a turntable onto which the recording medium held by the holder is mounted and a locating member for positioning the recording medium;
   a holder transfer mechanism for transferring said holder in a first direction approaching said driving section and in a second direction leaving said driving section;
   an elastic support member elastically supporting said driving section in said enclosure so that said driving section is elastically movable relative to said enclosure at least in said first direction;
   and a constraining mechanism constraining transfer of said driving section at least in said first direction;
   wherein, said recording medium driving apparatus has a configuration in which, if said holder having said recording medium inserted therein in an abnormal direction or posture moves in said first direction, the recording medium in said holder would come into contact with said turntable or said locating member; but before the holder having said recording medium inserted therein is transferred by said holder transfer mechanism in said first direction, or after beginning movement in said first direction and before said recording medium inserted in an abnormal direction or posture comes into contact with said turntable or said locating member, the constrained state of said driving section by said constraining mechanism in said first direction is released.

2. A recording medium driving apparatus according to claim 1, wherein said holder transfer mechanism comprises a moving member provided for reciprocating movement in said enclosure and a coupling section connecting the moving member and said holder;
   said constraining mechanism comprises a constraining section provided on said moving member and an engagement section provided on said driving section and engaging with the constraining section of said moving member;
   said holder is caused by said coupling section to move in said second direction along with movement of said moving member in a direction, and simultaneously, movement of said driving section in said first direction is regulated by said constraining section;
   and said holder is caused by said coupling section to move in said first direction along with movement of said moving member in another direction, and simultaneously, the constrained state in said first direction of said driving section by said constraining section is released.

3. A recording medium driving apparatus according to claim 2, wherein said moving member is provided with a stopper section which engages with said coupling section upon movement of said holder in said second direction and constrains the coupling section.

4. A recording medium driving apparatus according to claim 2, wherein said moving member is provided in said enclosure for reciprocating movement in a direction substantially perpendicular to said first and second directions; and an inclined cam which extends in inclination to said first and second directions and transfers said holder in said first and second directions and a constraining groove which extends in the same direction as the moving direction of the moving member and the engagement section of said driving section comes therein and thereout are formed on this moving member.

5. A recording medium driving apparatus according to claim 4, wherein said holder is connected to said driving section by way of said coupling section.

6. A recording medium driving apparatus according to claim 5, wherein said coupling section is provided with a fulcrum rotatably supported by said driving section, a connecting section coupled to said holder, and a transfer section driven by said inclined cam.

7. A recording medium driving apparatus according to claim 1, wherein a positioning section which, when said holder is transferred by said holder transfer mechanism in said second direction, comes into contact with said holder and constrains the holder in the contact state is provided in said enclosure.

8. A recording medium driving apparatus according to claim 7, wherein a pair of said positioning sections are provided so as to come into contact with edges of said holder on both sides in the width direction and in said second direction, respectively, and are formed in inclination so that the distance therebetween increases toward said driving section side.

9. A recording medium driving apparatus comprising an enclosure having an insertion port for insertion and discharge of a recording medium, a holder holding the recording medium inserted from said insertion port, a driving section having a turntable for mounting the recording medium held by the holder and a locating member for positioning the recording medium, a holder transfer mechanism causing said holder to move in a first direction approaching said driving section and in a second direction leaving said driving section, elastic supporting members elastically supporting said driving section within said enclosure so that said driving section is elastically movable relative to said enclosure at least in said first direction, and a constraining mechanism constraining movement of said driving section at least in said first direction; wherein, if said holder holding said recording medium inserted in an abnormal posture moves in said first direction, the recording medium in said holder would come into contact with said turntable or with said locating member;

wherein said holder transfer mechanism comprises a moving member provided for reciprocating movement within said enclosure and a coupling section coupling the moving member and said holder; and said constraining mechanism comprises a constraining section provided on said moving member, and an engagement section provided on said driving section and engaging with the constraining section of said moving member; and further wherein, along with movement of said moving member in a direction, said holder is caused by said coupling section to move in said second direction, and simultaneously, movement of said driving section in said first direction is regulated by said constraining section;

along with movement of said moving member in another direction, said holder is caused by said coupling section to move in said first direction, and simultaneously, the constrained state of said driving section in said first direction by said constraining section is released; and before the holder holding said recording medium inserted therein moves in said first direction along with movement of said moving member in another direction, or after the holder has begun moving in said first direction and before said recording medium inserted in an abnormal direction or posture comes into contact with said turntable or said locating member, the constrained state of said driving section by said constraining section in said first direction is released.

10. A recording medium driving apparatus according to claim 9, wherein said moving member is provided with a stopper section which engages with said coupling section upon movement of said holder in said second direction, and constrains the coupling section.

11. A recording medium driving apparatus according to claim 9, wherein said moving member is provided in said enclosure for reciprocating movement in a direction substantially perpendicular to said first and second directions; and an inclined cam which extends in inclination to said first and second directions and transfers said holder in said first and second directions and a constraining groove which extends in the same direction as the moving direction of the moving member and the engagement section of said driving section comes therein and thereout are formed on this moving member.

12. A recording medium driving apparatus according to claim 11, wherein said holder is connected to said driving section by way of said coupling section.

13. A recording medium driving apparatus according to claim 12, wherein said coupling section is provided with a fulcrum rotatably supported by said driving section, a connecting section coupled to said holder, and a transfer section driven by said inclined cam.

14. A recording medium driving apparatus according to claim 9, wherein a positioning section which, when said holder is transferred by said holder transfer mechanism in said second direction, comes into contact with said holder and constrains the holder in the contact state is provided in said enclosure.

15. A recording medium driving apparatus according to claim 14, wherein a pair of said positioning sections are provided so as to come into contact with edges of said holder on both sides in the width direction and in said second direction, respectively, and are formed in inclination so that the distance therebetween increases toward said driving section side.

16. A recording medium driving apparatus comprising an enclosure having an insertion port for insertion and discharge of a recording medium, a holder holding the recording medium inserted from said insertion port, a driving section having a turntable for mounting the recording medium held by the holder and a locating member for positioning the recording medium, a holder transfer mechanism causing said holder to move in a first direction approaching said driving section and in a second direction leaving said driving section, and elastic supporting members elastically supporting said driving section within said enclosure so that said driving section is elastically movable relative to said enclosure at least in said first direction, and a constraining mechanism constraining movement of said driving section at least in said first direction;

wherein said holder transfer mechanism comprises a moving member provided for reciprocating movement in a direction substantially perpendicular to said first and second directions in said enclosure and having an inclined cam extending in inclination in said first and second directions and a coupling section coupling said inclined cam and said holder;

said constraining mechanism comprising a constraining groove formed on said moving member and extending in the same direction as the moving direction of said moving member, and an engagement section provided on said driving section and capable of entering and leaving said constraining groove;

wherein, along with movement of said moving member in a direction, said holder moves through said coupling section in said second direction, and simultaneously, said engagement section enters said constraining groove so as to regulate movement of said driving section in said first direction, and along with movement of said moving member in another direction, said holder is caused by said inclined cam to move in said first direction by way of said coupling section, and simultaneously, said engagement section escapes from said constraining groove to release the constrained state of said driving section in said first direction; and further wherein, before the holder holding said recording medium inserted therein moves in said first direction along with movement of said moving member in another direction, or after the holder has begun moving in said first direction and before said recording medium inserted in an abnormal direction or posture comes into contact with said turntable or said locating member, the constrained state of said driving section by said constraining section in said first direction is released.

17. A recording medium driving apparatus according to claim 16, wherein a stopper section is provided in succession to said cam on said moving member, so that when said moving member moves in said one direction and said holder accordingly moves in said second direction, the stopper section engages with said coupling section and constrains the coupling section.

18. A recording medium driving apparatus according to claim 16, wherein said holder is connected to said driving section by way of said coupling section.

19. A recording medium driving apparatus according to claim 18, wherein said coupling section is provided with a fulcrum rotatably supported by said driving section, a connecting section coupled to said holder, and a transfer section driven by said inclined cam.

20. A recording medium driving apparatus according to claim 16, further comprising a positioning section which, when said holder is transferred by said holder transfer mechanism in said second direction, comes into contact with said holder and constrains the holder in the constrained state.

21. A recording medium driving apparatus according to claim 20, wherein a pair of said positioning sections are provided so as to come into contact with edges of said holder on both sides of the width direction and in said second direction, respectively, and are formed in inclination so that the distance therebetween increases toward said driving section side.

* * * * *